US012718420B2

(12) United States Patent
Kuma et al.

(10) Patent No.: US 12,718,420 B2
(45) Date of Patent: Aug. 25, 2026

(54) INFORMATION PROCESSING DEVICE AND METHOD

(71) Applicant: Sony Group Corporation, Tokyo (JP)

(72) Inventors: Satoru Kuma, Tokyo (JP); Tsuyoshi Kato, Kanagawa (JP); Kao Hayashi, Kanagawa (JP); Ohji Nakagami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 183 days.

(21) Appl. No.: 18/714,575

(22) PCT Filed: Dec. 15, 2022

(86) PCT No.: PCT/JP2022/046142
§ 371 (c)(1),
(2) Date: May 30, 2024

(87) PCT Pub. No.: WO2023/127513
PCT Pub. Date: Jul. 6, 2023

(65) Prior Publication Data

US 2025/0029285 A1 Jan. 23, 2025

(30) Foreign Application Priority Data

Dec. 28, 2021 (JP) ................................. 2021-214482

(51) Int. Cl.
*G06T 9/40* (2006.01)
*G06T 9/00* (2006.01)
(Continued)

(52) U.S. Cl.
CPC ................ *G06T 9/40* (2013.01); *G06T 9/001* (2013.01); *G06T 9/20* (2013.01); *G06T 15/04* (2013.01);
(Continued)

(58) Field of Classification Search
CPC .. G06T 9/40; G06T 9/001; G06T 9/20; G06T 15/04; G06T 17/205; G06T 2210/08; G06T 2210/36; G06T 9/00; H04N 19/20
See application file for complete search history.

(56) References Cited

U.S. PATENT DOCUMENTS 6,525,722 B1 * 2/2003 Deering .................. G06T 9/001
382/241
10,552,987 B2 * 2/2020 Laroche .................. G06T 17/20
(Continued)

FOREIGN PATENT DOCUMENTS

WO WO 2019/198523 A1 10/2019

OTHER PUBLICATIONS

Graziosi et al., [VPCC] [EE2.6-related] Mesh Patch Data, ISO/IEC JTC 1/SC 29/WG 7 m 55368, International Organisation for Standardisation Coding of Moving Pictures and Audio, Oct. 2020, pp. 1-14.

*Primary Examiner* — YuJang Tswei
(74) *Attorney, Agent, or Firm* — Paratus Law Group, PLLC

(57) ABSTRACT

There is provided an information processing device and method capable of independently controlling granularities of UV coordinates and vertex positions. Meta information including vertex information with a first granularity which indicates coordinates of vertices of a mesh is encoded, a geometry image with a second granularity of the mesh is encoded, a texture image with a third granularity of the mesh is encoded, and encoded data of the meta information, encoded data of the geometry image, and encoded data of the texture image are provided. The present disclosure may be applied to, for example, an information processing device, an electronic device, an information processing method, a program, or the like.

18 Claims, 14 Drawing Sheets

(51) Int. Cl.

| | |
|---|---|
| ***G06T 9/20*** | (2006.01) |
| ***G06T 15/04*** | (2011.01) |
| ***G06T 17/20*** | (2006.01) |

(52) U.S. Cl.

CPC ........ *G06T 17/205* (2013.01); *G06T 2210/08* (2013.01); *G06T 2210/36* (2013.01)

(56) References Cited

U.S. PATENT DOCUMENTS

| | | | | |
|---|---|---|---|---|
| 2018/0268570 | A1* | 9/2018 | Budagavi | G06T 9/001 |
| 2019/0087979 | A1* | 3/2019 | Mammou | H04N 19/597 |
| 2020/0014953 | A1* | 1/2020 | Mammou | H04N 19/17 |
| 2021/0090301 | A1* | 3/2021 | Mammou | H04N 19/20 |
| 2021/0174551 | A1* | 6/2021 | Graziosi | G06T 9/001 |
| 2021/0304354 | A1* | 9/2021 | Chang | G06T 9/001 |

* cited by examiner

M=T=G=T2=G2=2
(0, 0)
0
1
2
3
0
1
2
3
(1.0, 1.0)
42
UvCoord List=(3, 2), (1, 6), (7, 7)
0
1
2
3
0
1
2
3
41
(Tangent, BiTangent)=(3, 2), (1, 6), (7, 7)
Normal=value(3, 2), value(1, 6), value(7, 7)

FIG. 4

| | |
|---|---|
| 1 | TRANSMIT VERTEX LIST OF GRANULARITY CORRESPONDING TO PARAMETER M, GEOMETRY IMAGE WITH GRANULARITY CORRESPONDING TO PARAMETER G, AND TEXTURE IMAGE WITH GRANULARITY CORRESPONDING TO PARAMETER T |
| 1-1 | GENERATE GEOMETRY IMAGE BY USING PARAMETERS M AND G, GENERATE TEXTURE IMAGE BY USING PARAMETERS M AND T, AND PERFORM ENCODING THEREOF |
| 1-2 | PERFORM DECODING, GENERATE UV MAP WITH GRANULARITY CORRESPONDING TO PARAMETER T FROM VERTEX LIST BY USING PARAMETERS M AND T, AND GENERATE VERTEX INFORMATION WITH GRANULARITY CORRESPONDING TO PARAMETER G FROM GEOMETRY IMAGE AND VERTEX LIST BY USING PARAMETERS M AND G |
| 1-3 | TRANSMIT PARAMETERS M, T, AND G |
| 1-4 | SET EFFECTIVE REGIONS IN GEOMETRY IMAGE AND TEXTURE IMAGE |
| 1-4-1 | ARRANGE PATCHES IN EFFECTIVE REGIONS OF GEOMETRY IMAGE AND TEXTURE IMAGE AT TIME OF ENCODING |
| 1-4-2 | CUT OUT EFFECTIVE REGION FROM TEXTURE IMAGE WHEN PERFORMING DECODING |
| 1-4-3 | TRANSMIT PARAMETERS T2 AND G2 |
| 1-5 | PERFORM PROCESSING ON OVERLAPPING POINTS BY REDUCING RESOLUTION OF GEOMETRY IMAGE |
| 1-5-1 | APPLY AVERAGE OF PIXEL VALUES OF OVERLAPPING POINTS |
| 1-5-2 | ARRANGE IN NEIGHBORING PIXELS |
| 1-5-3 | TRANSMIT INFORMATION REGARDING OVERLAPPING POINTS SEPARATELY |
| 1-5-4 | ADJUST SURROUNDING PIXEL VALUES IN ACCORDANCE WITH INTERPOLATION METHOD |

0
1
2
3
A B
132
0
1
2
3
4
5
6
7
A
B
131

0
1
2
3
0
1
2
3
A
B
132

901
CPU
902
ROM
903
RAM
904
910
INPUT/OUTPUT INTERFACE
INPUT UNIT
911
OUTPUT UNIT
912
STORAGE UNIT
913
COMMUNICATION UNIT
914
DRIVE
915
REMOVABLE MEDIUM
921
900

INFORMATION PROCESSING DEVICE AND METHOD

CROSS REFERENCE TO PRIOR APPLICATION

This application is a National Stage Patent Application of PCT International Patent Application No. PCT/JP2022/046142 (filed on Dec. 15, 2022) under 35 U.S.C. § 371, which claims priority to Japanese Patent Application No. 2021-214482 (filed on Dec. 28, 2021), which are all hereby incorporated by reference in their entirety.

TECHNICAL FIELD

The present disclosure relates to an information processing device and method, and particularly to an information processing device and method capable of independently controlling granularities of UV coordinates and vertex positions.

BACKGROUND ART

Conventionally, a mesh (Mesh) has been used as 3D data representing an object having a three-dimensional shape. As a mesh compression method, a method of compressing a mesh by extending video-based point cloud compression (VPCC) has been proposed (see, for example, Non-Patent Document 1).

CITATION LIST

Non-Patent Document

Non-Patent Document 1: Danillo Graziosi, Alexandre Zaghetto, Ali Tabatabai, "[VPCC] [EE2.6-related] Mesh Patch Data", ISO/IEC JTC 1/SC 29/WG 7 m 55368, October 2020

SUMMARY OF THE INVENTION

Problems to be Solved by the Invention

However, in the case of this method, a geometry image and a texture image have the same image size (resolution), and granularities of UV coordinates of vertices or vertex positions (coordinates) in a UV map of the mesh depend on the resolution of the geometry image or the texture image. Therefore, it is difficult to independently control the UV coordinates and the vertex positions.

The present disclosure has been made in view of such a situation and enables granularities of UV coordinates and vertex positions to be independently controlled when encoding a mesh obtained by extending a 3D data encoding method using encoding for a two-dimensional image.

Solutions to Problems

An information processing device according to one aspect of the present technology includes: a meta information encoding unit that encodes meta information including vertex information with a first granularity which indicates coordinates of vertices of a mesh representing an object having a three-dimensional structure, and generates encoded data of the meta information; a geometry image encoding unit that encodes a geometry image with a second granularity set independently of the first granularity in which a plurality of patches obtained by dividing a geometry of the mesh is arranged, and generates encoded data of the geometry image; a texture image encoding unit that encodes a texture image with a third granularity set independently of the first granularity in which a plurality of patches obtained by dividing a texture of the mesh is arranged, and generates encoded data of the texture image; and a provision unit that provides the encoded data of the meta information, the encoded data of the geometry image, and the encoded data of the texture image.

An information processing method according to one aspect of the present technology includes: encoding meta information including vertex information with a first granularity which indicates coordinates of vertices of a mesh representing an object having a three-dimensional structure, and generating encoded data of the meta information; encoding a geometry image with a second granularity set independently of the first granularity in which a plurality of patches obtained by dividing a geometry of the mesh is arranged, and generating encoded data of the geometry image; encoding a texture image with a third granularity set independently of the first granularity in which a plurality of patches obtained by dividing a texture of the mesh is arranged, and generating encoded data of the texture image; and providing the encoded data of the meta information, the encoded data of the geometry image, and the encoded data of the texture image.

An information processing device according to another aspect of the present technology includes: an acquisition unit that acquires, from a bitstream of a mesh representing an object having a three-dimensional structure, encoded data of meta information including vertex information with a first granularity which indicates coordinates of vertices of the mesh, encoded data of a geometry image with a second granularity set independently of the first granularity in which a plurality of patches obtained by dividing a geometry of the mesh is arranged, and a texture image with a third granularity set independently of the first granularity in which a plurality of patches obtained by dividing a texture of the mesh is arranged; a meta information decoding unit that decodes the encoded data of the meta information and generates the meta information including the vertex information with the first granularity; a geometry image decoding unit that decodes the encoded data of the geometry image with the second granularity and generates the geometry image with the second granularity; and a texture image decoding unit that decodes the encoded data of the texture image with the third granularity and generates the texture image with the third granularity.

An information processing method according to another aspect of the present technology includes: acquiring, from a bitstream of a mesh representing an object having a three-dimensional structure, encoded data of meta information including vertex information with a first granularity which indicates coordinates of vertices of the mesh, encoded data of a geometry image with a second granularity set independently of the first granularity in which a plurality of patches obtained by dividing a geometry of the mesh is arranged, and a texture image with a third granularity set independently of the first granularity in which a plurality of patches obtained by dividing a texture of the mesh is arranged; decoding the encoded data of the meta information and generating the meta information including the vertex information with the first granularity; decoding the encoded data of the geometry image with the second granularity and generating the geometry image with the second granularity;

and decoding the encoded data of the texture image with the third granularity and generating the texture image with the third granularity.

In the information processing device and method according to one aspect of the present technology, encoding is performed on meta information including vertex information with a first granularity which indicates coordinates of vertices of a mesh representing an object having a three-dimensional structure, and encoded data of the meta information is generated.

Encoding is performed on a geometry image with a second granularity set independently of the first granularity in which a plurality of patches obtained by dividing a geometry of the mesh is arranged, and encoded data of the geometry image is generated. Encoding is performed on a texture image with a third granularity set independently of the first granularity in which a plurality of patches obtained by dividing a texture of the mesh is arranged, and encoded data of the texture image is generated. The encoded data of the meta information, the encoded data of the geometry image, and the encoded data of the texture image are provided.

In the information processing device and method according to another aspect of the present technology, acquisition of encoded data of meta information including vertex information with a first granularity which indicates coordinates of vertices of the mesh, encoded data of a geometry image with a second granularity set independently of the first granularity in which a plurality of patches obtained by dividing a geometry of the mesh is arranged, and a texture image with a third granularity set independently of the first granularity in which a plurality of patches obtained by dividing a texture of the mesh is arranged is performed from a bitstream of a mesh representing an object having a three-dimensional structure. The encoded data of the meta information is decoded, and the meta information including the vertex information with the first granularity is generated. The encoded data of the geometry image with the second granularity is decoded, and the geometry image with the second granularity is generated. The encoded data of the texture image with the third granularity is decoded, and the texture image with the third granularity is generated.

BRIEF DESCRIPTION OF DRAWINGS

FIG. 4 is a diagram for describing a method of controlling granularities of a UV map and vertex coordinates.

MODE FOR CARRYING OUT THE INVENTION

Hereinafter, modes for carrying out the present disclosure (hereinafter referred to as embodiments) will be described. Note that description will be given in the following order.

1. Mesh Compression by Extending VPCC
2. Control of Granularities of UV Map and Vertex Coordinates
3. First Embodiment (Encoding Device)
4. Second Embodiment (Decoding Device)
5. Supplementary Note

1. Mesh Compression by Extending VPCC

<Documents and the Like that Support Technical Contents and Technical Terms>

The scope disclosed in the present technology includes, in addition to the contents described in the embodiments, contents described in the following Non-Patent Documents and the like known at the time of filing, contents of other documents referred to in the following Non-Patent Documents, and the like.

Non-Patent Document 1: (described above)

That is, the contents described in the above-described Non-Patent Documents, the contents of other documents referred to in the above-described Non-Patent Documents, and the like are also a basis for determining the support requirement.

<Point Cloud>

Conventionally, there has been 3D data such as a point cloud representing a three-dimensional structure by point position information, point attribute information, and the like.

For example, in the case of the point cloud, a three-dimensional structure (an object having a three-dimensional shape) is represented as a set of a large number of points. The point cloud includes position information (also referred to as geometry) and attribute information (also referred to as attributes) regarding each point. The attributes can include any information. For example, color information, reflectance information, normal line information, and the like regarding each point may be included in the attributes. As described above, the point cloud has a relatively simple data structure and can express any three-dimensional structure with a sufficient granularity by using a sufficiently large number of points.

<VPCC>

Video-based point cloud compression (VPCC) is one of such point cloud encoding techniques and encodes point cloud data, which is 3D data representing a three-dimensional structure, using a codec for two-dimensional images.

In the VPCC, the geometry and the attribute of a point cloud are each decomposed into small regions (also referred to as patches), and each patch is projected onto a projection plane that is a two-dimensional plane. For example, the geometry and the attribute are projected onto any of the six surfaces of the bounding box containing the object. The geometry and the attribute projected on the projection plane are also referred to as projection images. Furthermore, the patch projected on the projection plane is also referred to as a patch image.

Figure 1:
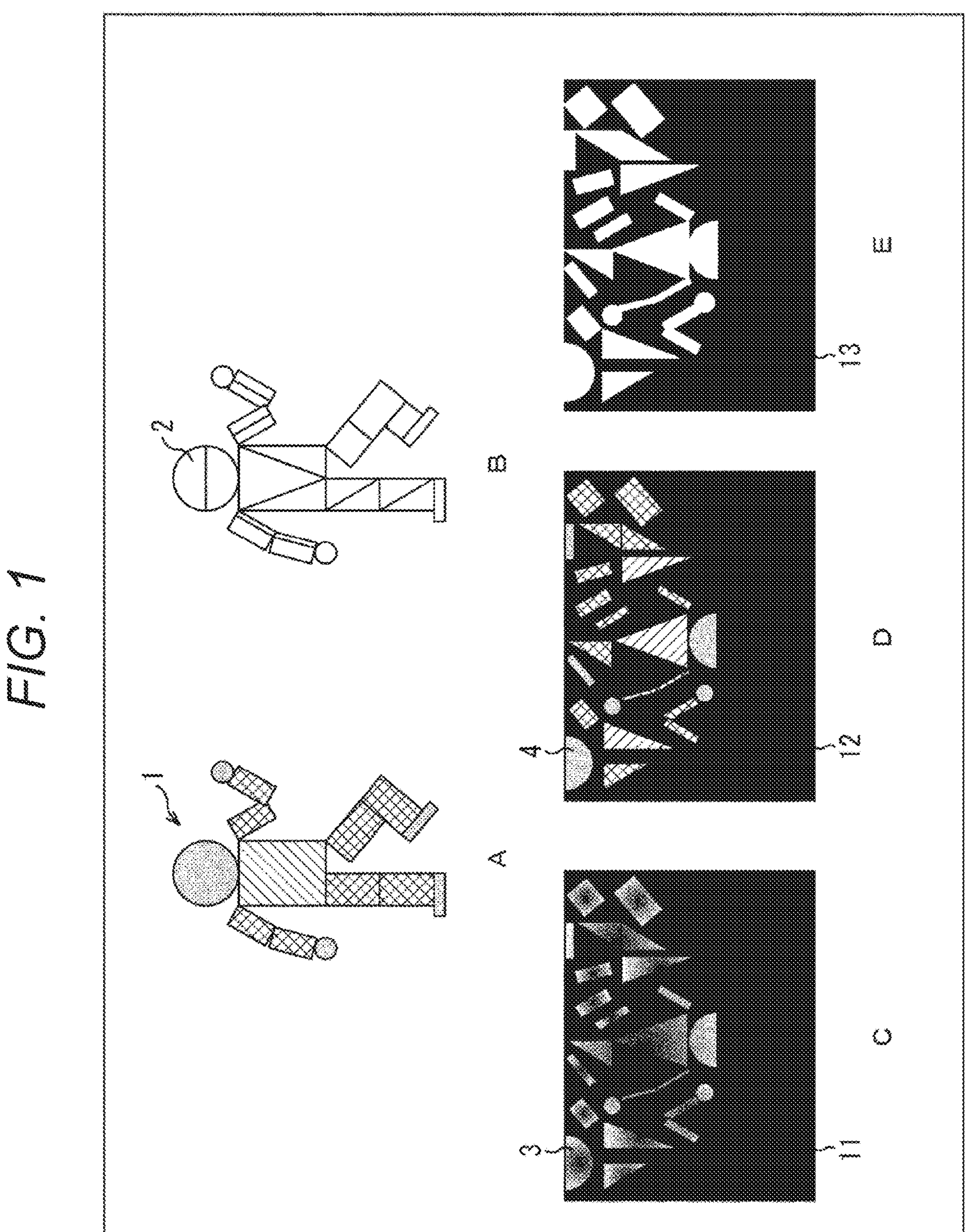
FIG. 1 is a diagram for describing a video-based approach.

For example, the geometry of a point cloud 1 illustrating an object having a three-dimensional structure illustrated in A of FIG. 1 is decomposed into patches 2 as illustrated in B of FIG. 1, and each patch is projected onto a projection plane. That is, a patch image (projection image for each patch) of the geometry is generated. Each pixel value of the patch image of the geometry indicates a distance (depth value (Depth)) from the projection plane to the point.

The attribute of the point cloud 1 is also decomposed into patches 2 similarly to the geometry, and each patch is projected onto the same projection plane as that for the geometry. That is, a patch image of the same size and same shape attribute as the patch image of the geometry is generated. Each pixel value of the patch image of the attribute indicates an attribute (color, normal vector, reflectance, and the like) of a point at the same position of the patch image of the corresponding geometry.

Then, each patch image generated in this way is disposed in a frame image (also referred to as a video frame) of a video sequence. That is, each patch image on the projection plane is arranged on a predetermined two-dimensional plane.

For example, the frame image in which the patch images of the geometry are arranged is also referred to as a geometry video frame. Furthermore, this geometry video frame is also referred to as a geometry image, a geometry map, or the like. The geometry image 11 illustrated in C of FIG. 1 is a frame image (geometry video frame) in which the patch images 3 of the geometry are arranged. The patch images 3 correspond to the patches 2 in B of FIG. 1 (the patches 2 of the geometry are projected onto the projection plane).

In addition, the frame image in which the patch images of the attribute are arranged is also referred to as an attribute video frame. Furthermore, the attribute video frame is also referred to as an attribute image or an attribute map. The attribute image 12 illustrated in D of FIG. 1 is a frame image (attribute video frame) in which the patch images 4 of the attribute are arranged. The patch images 4 correspond to the patches 2 in B of FIG. 1 (the patches 2 of the attribute are projected on the projection plane).

Then, these video frames are encoded by an encoding method for a two-dimensional image, such as, for example, advanced video coding (AVC) or high efficiency video coding (HEVC). That is, point cloud data that is 3D data representing a three-dimensional structure can be encoded using a codec for a two-dimensional image. Generally, an encoder of 2D data is more widespread than an encoder of 3D data, and can be realized at low cost. That is, by applying the video-based approach as described above, an increase in cost can be suppressed.

Note that, in the case of such a video-based approach, an occupancy image (also referred to as an occupancy map) can also be used. The occupancy image is map information indicating the presence or absence of the projection image (patch image) for each of N×N pixels of the geometry video frame and the attribute video frame. For example, an occupancy image indicates the region in the geometry image or the attribute image where the patch image exists (N×N pixels) with the value "1" and the region where the patch image does not exist (N×N pixels) with the value "0".

Such an occupancy image is encoded as data different from the geometry image and the attribute image and transmitted to the decoding side. Since the decoder can grasp whether or not the region is a region where the patch exists by referring to this occupancy map, it is possible to suppress the influence of noise and the like caused by encoding/decoding, and to reconstruct the point cloud more accurately. For example, even if the depth value changes due to encoding/decoding, the decoder can ignore the depth value of the region where no patch image exists (not process the depth value as the position information of the 3D data) by referring to the occupancy map.

For example, the occupancy image 13 as illustrated in E of FIG. 1 may be generated for the geometry image 11 in C of FIG. 1 or the attribute image 12 in D of FIG. 1. In the occupancy image 13, a white portion indicates the value "1" and a black portion indicates the value "0".

It should be noted that, similarly to the geometry video frame, the attribute video frame, and the like, this occupancy image can also be transmitted as a video frame. That is, similarly to the geometry and the attribute, encoding is performed by an encoding method for a two-dimensional image such as AVC or HEVC.

That is, in the case of the VPCC, the geometry and the attribute of the point cloud are projected onto the same projection plane and are arranged at the same position in the frame image. That is, the geometry and the attribute of each point are associated with each other by the position on the frame image.

<Mesh>

Figure 2:
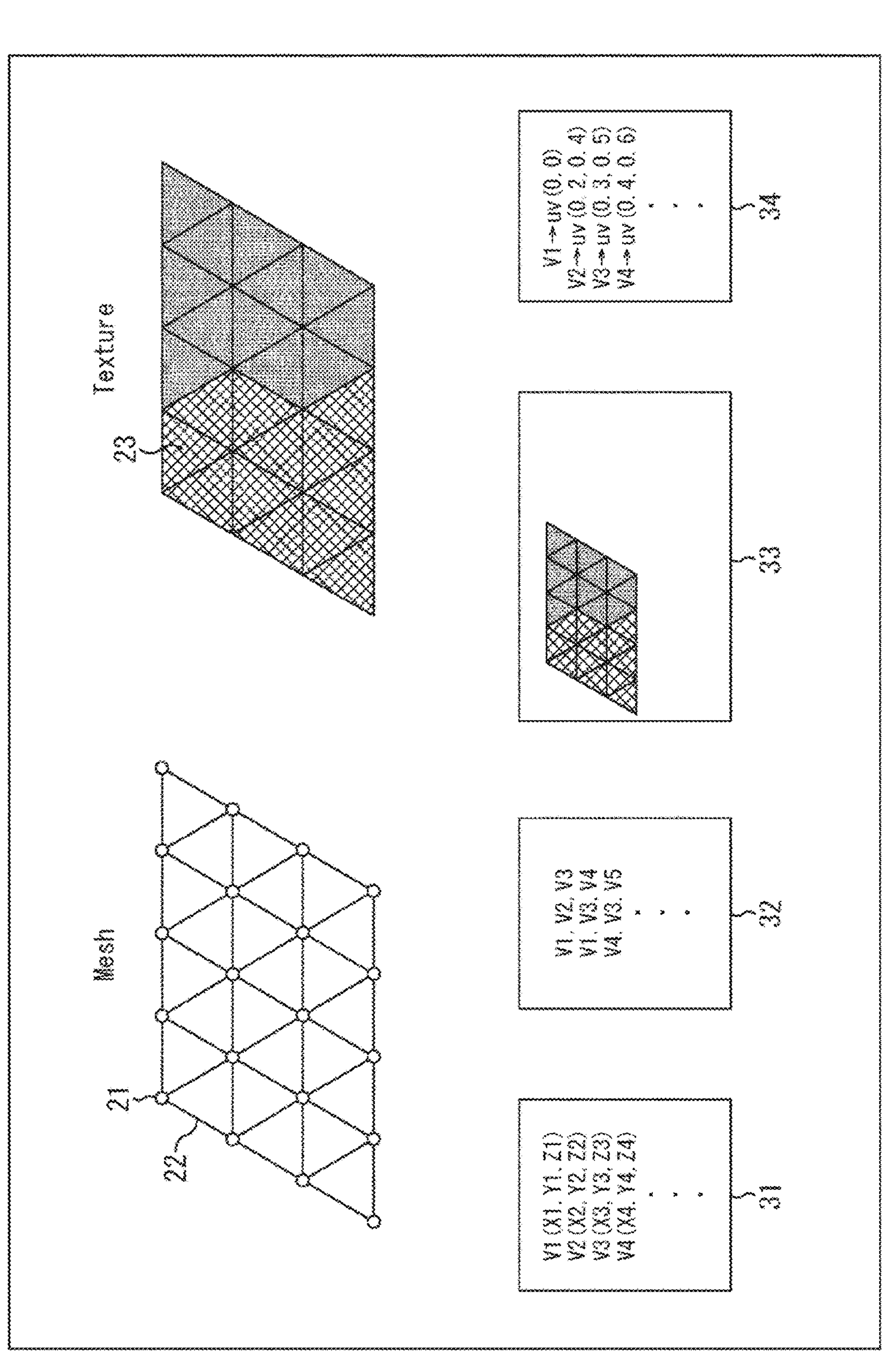
FIG. 2 is a diagram for describing a mesh.

Meanwhile, as 3D data representing an object having a three-dimensional structure, for example, a mesh exists in addition to a point cloud. As illustrated in FIG. 2, the mesh represents the surface of the object in the three-dimensional space by a polygon that is a plane (polygon) surrounded by the sides 22 connecting the vertices 21. As illustrated in FIG. 2, the 3D data representing the object includes the mesh and the texture 23 attached to each polygon.

For example, as illustrated in the lower part of FIG. 2, the mesh includes vertex information 31 including position information (three-dimensional coordinates (X, Y, Z)) regarding each vertex 21, connectivity 32 indicating a vertex 21 and a side 22 forming each polygon, a texture image 33 that is map information regarding a texture 23 attached to each polygon, and a UV map 34 indicating a position (that is, the position of each vertex 21 in the texture image 33) in the texture image 33 of the texture corresponding to each vertex 21. The UV map 34 indicates positions of vertices by UV coordinates which are coordinates on the texture image 33.

In the case of the mesh, unlike the case of the VPCC described above, the correspondence between each vertex 21 and the texture 23 is indicated by the UV map 34. Hence, as in the example of FIG. 2, the texture image 33 is configured as map information independent of the vertex information 31 configured by the three-dimensional coordinates of each vertex. Therefore, in the texture image 33, the projection direction and resolution of the texture 23 of each polygon can be arbitrarily set.

<Mesh Compression Using VPCC>

As a method of compressing such a mesh, for example, a method of compressing (encoding) a mesh by extending the VPCC described above has been proposed in Non-Patent Document 1 and the like.

In the case of the method of compressing (encoding) a mesh by extending the VPCC, similarly to the texture, the geometry is also divided into a plurality of patches to be arranged in a single image, and encoding is performed by the encoding method for a two-dimensional image. That is, a geometry of a mesh is divided into a plurality of patches to be arranged in a geometry image, and encoding is performed. Similarly, a texture is divided into a plurality of patches to be arranged in a texture image, and encoding is performed.

Sizes of the geometry image and the texture image are the same (Geometry image size=Texture image size=(imageWidth, imageHeight)). In a case where the geometry and the texture have respective resolutions different from each other, the resolutions of the geometry and the texture are unified by resolution conversion. Then, a position (x, y) of the geometry image corresponds to a position (tex_x, tex_y) of the texture image.

UV coordinates are derived from the coordinates (x, y) of the geometry image of the vertices, for example, as in the following Expressions (1) or (2).

$$u = ((\text{double})\text{tex\_x} + 0.5)/imageWidth\ (0.0 <= u <= 1.0) \quad (1)$$

$$v = ((\text{double})\text{tex\_y} + 0.5)/imageHeight\ (0.0 <= v <= 1.0) \quad (2)$$

The maximum bit depth (that is, resolving power) of the coordinates of the geometry is defined by geometry3dCoordinatesBitdepth. LoD can be controlled on a patch basis by levelOfDetailX and levelOfDetailY. In this case, the resolving power (geometry3dCoordinatesBitdepth) of the geometry is the upper limit of the position granularity in directions of a tanget and a bi-tangent of a vertex and is the resolving power of the UV coordinates.

$$\text{Normal} = imageValue(x, y) \quad (3)$$

$$\text{Tangent} = patchOrigin + U \text{ or } V \quad (4)$$

$$\text{Bi} - \text{tangent} = patchOrigine + V \text{ or } U \quad (5)$$

Figure 3:
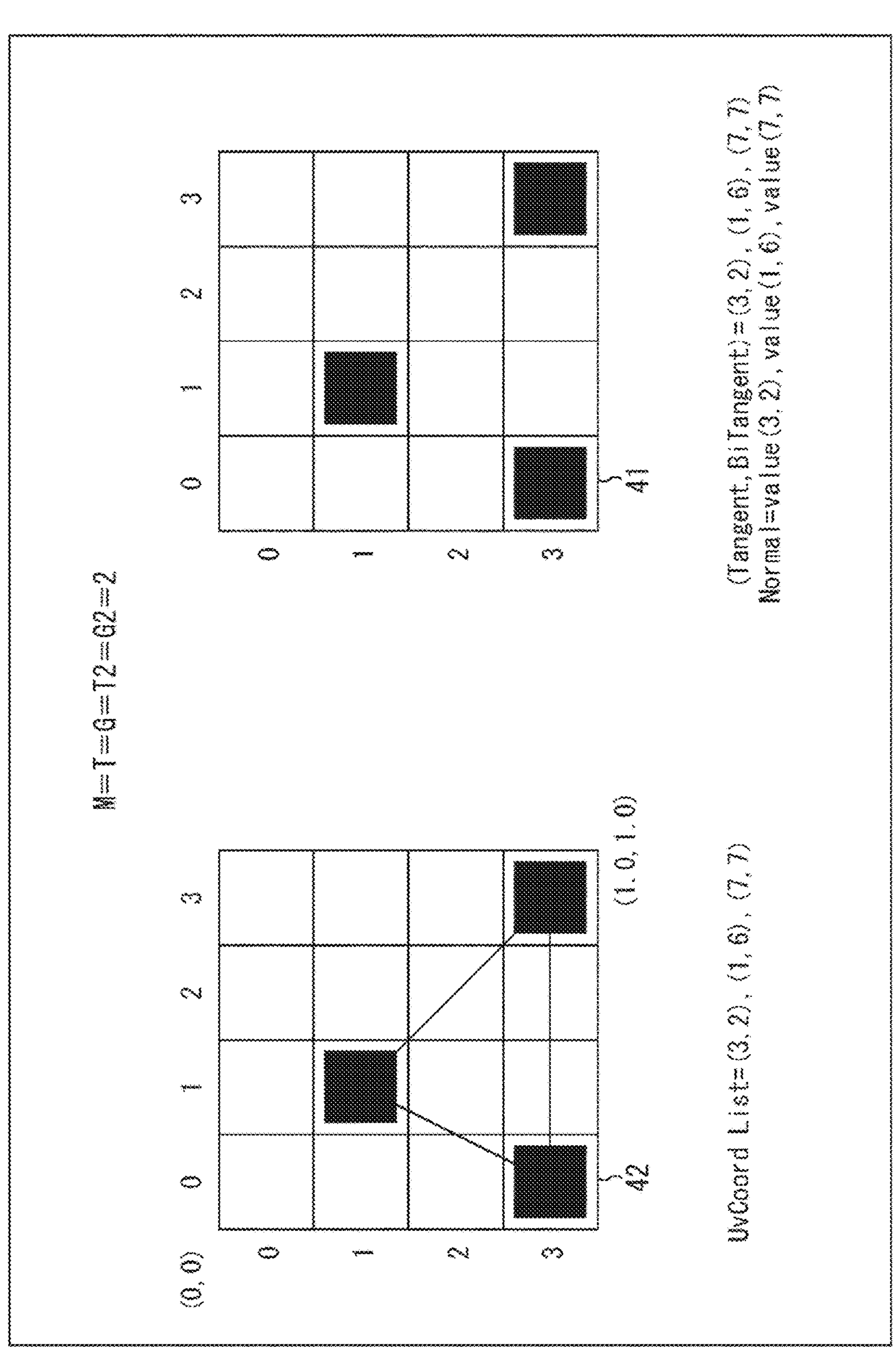
FIG. 3 is a diagram for describing granularities of geometry and texture.

The U and V are determined by the resolution granularity of the geometry image (texture image). Hence, for example, in a case where the resolution of a geometry image 41 is 4×4 as illustrated in FIG. 3, the resolution of geometry is also 4×4. Furthermore, in this case, the resolution of a texture image is also 4×4, and the resolution of texture is also 4×4. As described above, it is difficult to independently control the resolutions of the geometry and the texture. That is, it is difficult to independently control the UV coordinates and vertex positions of a mesh.

Therefore, for example, in order to increase the granularity of the UV coordinates, it is necessary to increase not only the resolution of the texture image but also the resolution of the geometry image (depth image). For example, in a case where the resolution of the texture is higher (the resolving power is higher) than that of the geometry in a mesh, it is necessary to unnecessarily increase the resolution of the geometry image to maintain the resolution of the texture. That is, the resolution of the geometry image needs to be higher than the resolution of the geometry of the mesh. Therefore, redundant pixels in the geometry image are compressed by a 2D codec, and there is a possibility that the encoding efficiency will be reduced. Furthermore, in this case, it is necessary to perform the resolution conversion of the geometry, and it is necessary not only to increase throughput but also to internally hold image data after the resolution conversion. That is, there is a possibility that a load of encoding or decoding processes will increase.

2. Control of Granularities of UV Map and Vertex Coordinates

<Independent Control of UV Coordinates and Vertex Positions>

Incidentally, when encoding of a mesh obtained by extending a 3D data encoding method using encoding for a two-dimensional image is performed, the UV coordinates and the vertex positions are to be independently controlled. For example, as illustrated in the uppermost row of the table in FIG. 4, a vertex list of a granularity corresponding to a parameter M, a geometry image with a granularity corresponding to a parameter G, and a texture image with a granularity corresponding to a parameter T are transmitted (Method 1). Here, the parameter M is a parameter indicating a granularity (resolving power) of coordinates of vertices which is transmitted as the vertex list. The parameter G is a parameter for deriving a granularity (resolving power) of a geometry image in which patches of geometry of a mesh are arranged. The parameter T is a parameter for deriving a granularity (resolving power) of a texture image in which patches of texture of a mesh are arranged. In other words, the parameter T is a parameter for deriving a granularity of UV coordinates.

For example, as the vertex list of the granularity corresponding to the parameter M, coordinates (master_x, master_y) of vertices with the granularity and a range (master_width, master_height) of values that can be taken by the coordinates may be transmitted.

For example, the resolving power of the UV coordinates may be derived by 1/power (2, M−T) of M. Furthermore, the resolving power in each of a normal direction (Normal) of a vertex and two directions (tangent and bi-tangent) of the plane may be derived by 1/power (2, M−G) of M. Here, power (A, B) represents A^B (A to the power of B). Furthermore, the parameter G may be equal to or less than the parameter M.

For example, coordinates and an image size (x, y, w, h) of the geometry image or the texture image can be expressed as the following Expressions (6) to (9) by functions of bit shift and offset.

$$(x, y, w, h) = f(\text{shift}, \text{offset}) \quad (6)$$

$$\text{shift} = M - X \quad (7)$$

$$(x, y) = (int(\text{master\_x} >> \text{shift}),\ int(\text{master\_y} >> \text{shift})) + (int(\text{offset\_x} >> \text{shift}),\ int(\text{offset\_y} >> \text{shift})) \quad (8)$$

$$(w, h) = (\text{master\_width} >> \text{shift},\ \text{master\_height} >> \text{shift}) \quad (9)$$

The coordinates of the vertex positions can be expressed by the following Expressions (10) and (11).

$$(\text{x\_g}, \text{y\_g}, \text{w\_g}, \text{h\_g}) = f(M - G,\ offsetG) \quad (10)$$

$$(\text{x\_t}, \text{y\_t}, \text{w\_t}, \text{h\_t}) = f(M - T,\ offsetT) \quad (11)$$

The UV coordinates can be expressed as the following Expressions (12) to (15).

$$\text{shift} = M - T \quad (12)$$

$$(\text{x\_t}, \text{y\_t}, \text{w\_t}, \text{h\_t}) = f(M - T,\ offsetT) \quad (13)$$

$$u = (\text{x\_t} + 0.5)/\text{w\_t} \quad (14)$$

$$v = (\text{y\_t} + 0.5)/\text{h\_t} \quad (15)$$

That is, the vertex coordinates with a high granularity are transmitted, and these parameters of encoded data can be set independently.

For example, an information processing device includes: a meta information encoding unit that encodes meta information including vertex information with a first granularity which indicates coordinates of vertices of a mesh representing an object having a three-dimensional structure, and generates encoded data of the meta information; a geometry image encoding unit that encodes a geometry image with a second granularity set independently of the first granularity in which a plurality of patches obtained by dividing a geometry of the mesh is arranged, and generates encoded data of the geometry image; a texture image encoding unit that encodes a texture image with a third granularity set independently of the first granularity in which a plurality of patches obtained by dividing a texture of the mesh is arranged, and generates encoded data of the texture image; and a provision unit that provides the encoded data of the meta information, the encoded data of the geometry image, and the encoded data of the texture image.

For example, an information processing method includes: encoding meta information including vertex information with a first granularity which indicates coordinates of vertices of a mesh representing an object having a three-dimensional structure, and generating encoded data of the meta information; encoding a geometry image with a second granularity set independently of the first granularity in which a plurality of patches obtained by dividing a geometry of the mesh is arranged, and generating encoded data of the geometry image; encoding a texture image with a third granularity set independently of the first granularity in which a plurality of patches obtained by dividing a texture of the mesh is arranged, and generating encoded data of the texture image; and providing the encoded data of the meta information, the encoded data of the geometry image, and the encoded data of the texture image.

Furthermore, an information processing device may include: an acquisition unit that acquires, from a bitstream of a mesh representing an object having a three-dimensional structure, encoded data of meta information including vertex information with a first granularity which indicates coordinates of vertices of the mesh, encoded data of a geometry image with a second granularity set independently of the first granularity in which a plurality of patches obtained by dividing a geometry of the mesh is arranged, and a texture image with a third granularity set independently of the first granularity in which a plurality of patches obtained by dividing a texture of the mesh is arranged; a meta information decoding unit that decodes the encoded data of the meta information and generates the meta information including the vertex information with the first granularity; a geometry image decoding unit that decodes the encoded data of the geometry image with the second granularity and generates the geometry image with the second granularity; and a texture image decoding unit that decodes the encoded data of the texture image with the third granularity and generates the texture image with the third granularity.

Furthermore, an information processing method may include: acquiring, from a bitstream of a mesh representing an object having a three-dimensional structure, encoded data of meta information including vertex information with a first granularity which indicates coordinates of vertices of the mesh, encoded data of a geometry image with a second granularity set independently of the first granularity in which a plurality of patches obtained by dividing a geometry of the mesh is arranged, and a texture image with a third granularity set independently of the first granularity in which a plurality of patches obtained by dividing a texture of the mesh is arranged; decoding the encoded data of the meta information and generating the meta information including the vertex information with the first granularity; decoding the encoded data of the geometry image with the second granularity and generating the geometry image with the second granularity; and decoding the encoded data of the texture image with the third granularity and generating the texture image with the third granularity.

The first granularity is, for example, a granularity (resolving power) of coordinates of vertices transmitted as a vertex list, the granularity being indicated by the parameter M. The second granularity is a granularity (resolving power) of the geometry image derived using the parameter G. The third granularity is a granularity (resolving power) of the texture image derived using the parameter T. In other words, the third granularity is a granularity (resolving power) of UV coordinates. These parameters can be set independently. In the present disclosure, information regarding the first granularity, the second granularity, and the third granularity may be referred to as granularity information.

In this manner, the resolving power of the geometry image to be encoded and the resolving power of the texture image can be set independently. That is, the UV coordinates and the vertex positions can be controlled independently.

Figure 5:
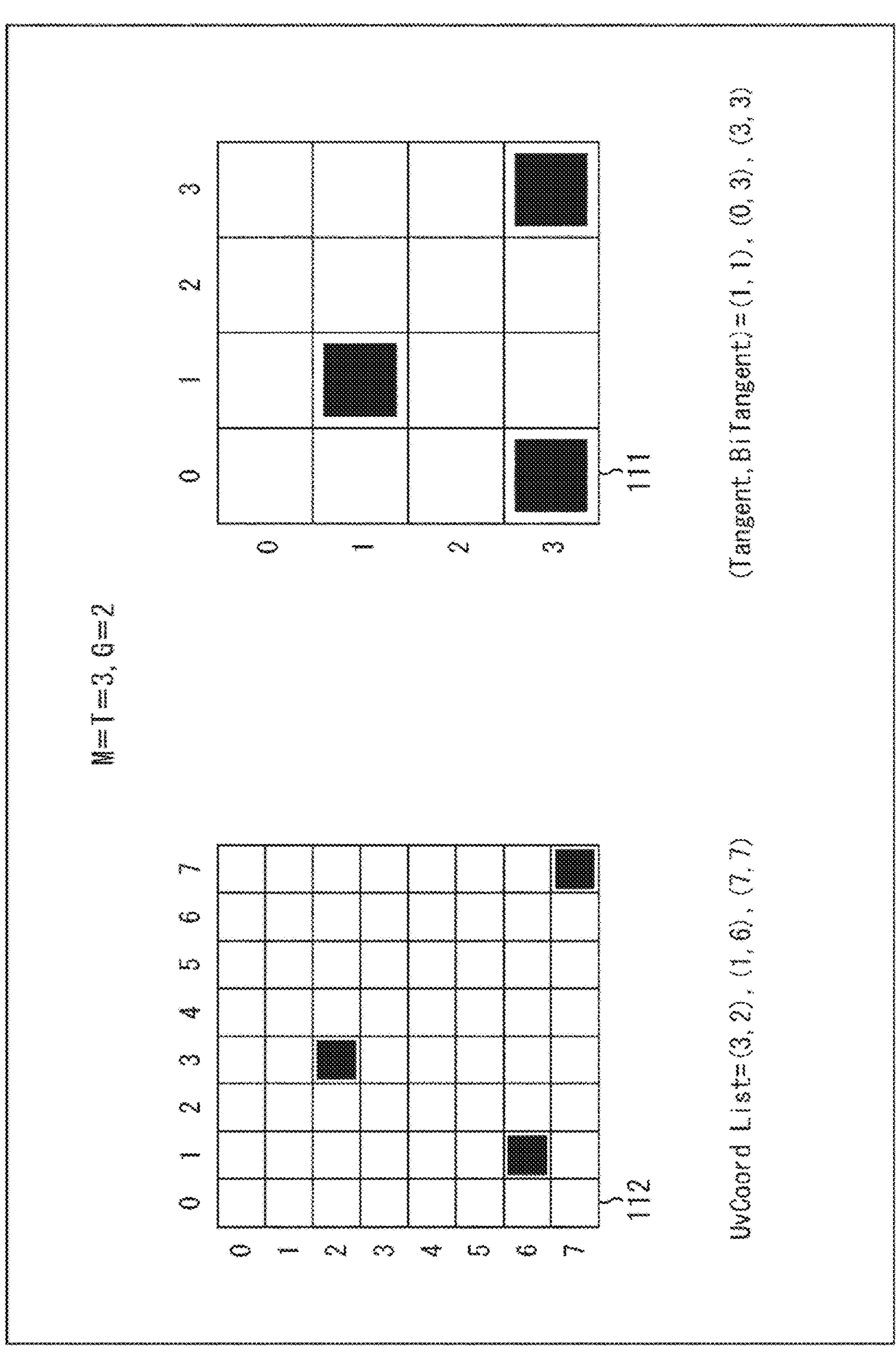
FIG. 5 is a diagram for describing granularities of geometry and texture.

In other words, the resolution (image size) of the geometry image and the resolution (image size) of the texture image can be set independently of each other. Hence, the resolution of the geometry image can be set according to a granularity of geometry, and the resolution of the texture image can be set according to a granularity of texture. For example, even in a case where a granularity of texture is higher than a granularity of geometry in a mesh, the texture image can have a resolution higher than that of the geometry image. For example, while a geometry image 111 illustrated in FIG. 5 has a resolution of 4×4, a texture image 112 can have a resolution of 8×8. Therefore, there is no need to make the resolution of the geometry image higher than the granularity of the geometry as in the related art, and a reduction in encoding efficiency can be curbed.

Furthermore, the resolution of the geometry image can be set independently of the granularity of the vertex coordinates. Therefore, for example, it is possible to reduce the resolution of the geometry image and transmit the geometry image (that is, the resolving power of the geometry is reduced), and thus it is possible to curb a reduction in encoding efficiency. At that time, since there is no need to reduce the resolution of the texture image to match the reduction in resolution of the geometry image, it is possible to curb a reduction in subjective quality of the 3D data (that is, a reduction in quality of the texture).

In the case where the above-described Method 1 is applied, for example, as illustrated in the second row from the top of the table in FIG. 4, an encoding device may generate a geometry image by using the parameter M and the parameter G, generate a texture image by using the parameter M and the parameter T, and perform encoding thereof (Method 1-1).

For example, the information processing device may further include a geometry image generation unit that generates the geometry image with the second granularity, and a texture image generation unit that generates the texture image with the third granularity. The geometry image encoding unit may encode the geometry image generated by the geometry image generation unit, and the texture image encoding unit may encode the texture image generated by the texture image generation unit.

Furthermore, in the case where the above-described Method 1 is applied, as illustrated in the third row from the top of the table in FIG. 4, a decoding device may generate the UV map with the granularity corresponding to the parameter T by using the parameter M and the parameter T from a vertex list obtained by decoding the bitstream. Furthermore, vertex information with a granularity corresponding to the parameter G may be generated using the parameter M and the parameter G from the geometry image and the vertex list obtained by decoding the bitstream (Method 1-2).

For example, the information processing device may further include a UV map generation unit that generates a UV map with the third granularity on the basis of the vertex information with the first granularity and the granularity information regarding the first granularity, the second granularity, and the third granularity. Furthermore, there may further be provided a patch reconstruction unit that reconstructs the plurality of patches arranged in the geometry image with the second granularity to have the first granularity on the basis of the granularity information, and a vertex information reconstruction unit that reconstructs the vertex information to have the first granularity on the basis of the plurality of reconstructed patches.

Furthermore, in the case where the above-described Method 1 is applied, for example, as illustrated in the fourth row from the top of the table in FIG. 4, the parameter M, the parameter T, and the parameter G may be transmitted from the encoding device to the decoding device (Method 1-3).

For example, in the information processing device, the provision unit may further provide granularity information regarding the first granularity, the second granularity, and the third granularity. Furthermore, in the information processing device, the acquisition unit may acquire the granularity information from the bitstream. Here, the granularity information (that is, information regarding the first granularity, the second granularity, and the third granularity) may include the parameter M, the parameter T, and the parameter G.

As described above, by transmitting the parameter M, the parameter T, and the parameter G, the encoding device can explicitly control the granularity of the UV map and the vertex information obtained by decoding.

Note that, regarding the parameter T and the parameter G, a value in an x direction and a value in a y direction of the two-dimensional image may be equal to each other or may be different from each other. Furthermore, values of the parameter T and the parameter G may be absolute values or differences (for example, a difference (M−T or M−G) with respect to the parameter M). Furthermore, the values of the parameter T and the parameter G may be integer values or values other than integer values (a numerator or a denominator). Furthermore, the decoding device may derive the parameter T from a ratio of the image size of the texture image. In that case, the transmission of the parameter T can be omitted. Furthermore, the decoding device may derive the parameter G from a ratio of the image size of the geometry image. In that case, the transmission of the parameter G can be omitted.

<Setting of Effective Region>

In the case where the above-described Method 1 is applied, for example, as illustrated in the fifth row from the top of the table in FIG. 4, effective regions may be set in the geometry image and the texture image (Method 1-4). For example, an effective region having a size corresponding to a parameter G2 may be set in the geometry image. Furthermore, an effective region having a size corresponding to a parameter T2 may be set in the texture image. Here, the parameter G2 is a parameter for deriving the size of the effective region in the geometry image. The parameter T2 is a parameter for deriving the size of the effective region in the texture image. Furthermore, the effective region is a region in which patches can be arranged. That is, by setting the effective region, the region in which the patches can be arranged can be limited. In other words, no patches are arranged in a region outside this effective region of the geometry image or the texture image.

In the case where the Method 1-4 is applied, for example, at the time of encoding, the patches may be arranged in the effective regions of the geometry image and the texture image (Method 1-4-1). For example, in the information processing device, the geometry image generation unit may arrange the plurality of patches of the geometry within the effective region having a first size in the geometry image. Furthermore, the texture image generation unit may arrange the plurality of patches of the texture in the effective region having a second size in the texture image.

The first size is, for example, a size of the effective region of the geometry image which corresponds to the parameter G2. For example, the first size may be 1/power (2, M−T2) of M. The second size is, for example, a size of the effective region of the texture image which corresponds to the parameter T2. For example, the second size may be 1/power (2, M−G2) of M.

Furthermore, in the case where Method 1-4 is applied, at the time of decoding, the effective region may be cut out from the texture image (Method 1-4-2). For example, in the information processing device, the patch reconstruction unit may reconstruct the plurality of patches of the geometry image with the second granularity arranged in the effective region having the first size to have the first granularity. Furthermore, the information processing device may further include a cutout unit that cuts out the effective region having the second size from the texture image with the third granularity on the basis of the information regarding the second size.

Figure 6:
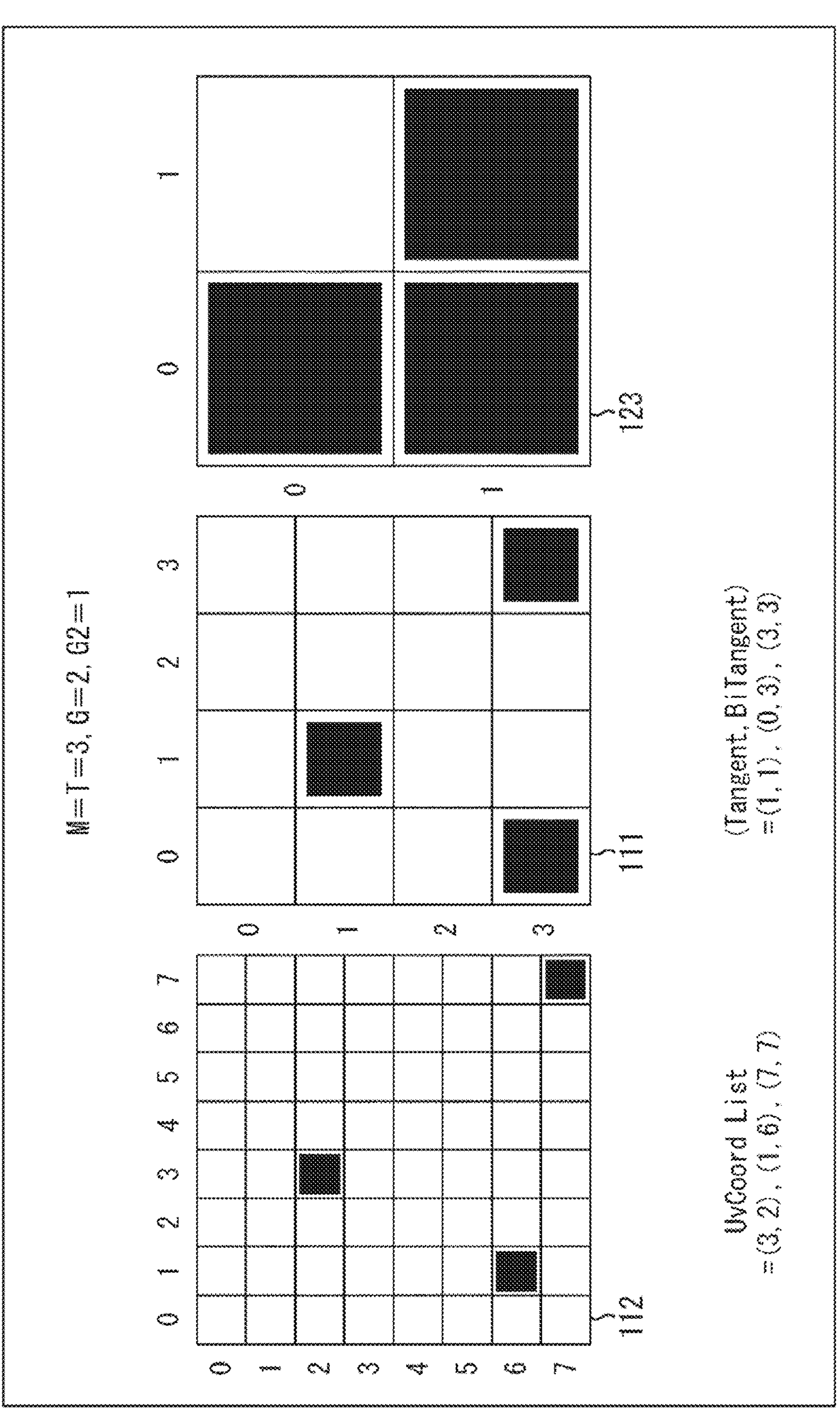
FIG. 6 is a diagram for describing the granularity of geometry and texture.

For example, when the effective region is set for the geometry image, the patches are arranged in the effective region, so that the geometry is substantially represented by the resolution of the effective region. That is, the resolution of the geometry can be reduced, and the encoding efficiency can be further improved as compared with the case of encoding with a 4×4 resolution. For example, as illustrated in FIG. 6, when an effective region 123 with a 2×2 resolution is set in the geometry image 111 with the 4×4 resolution, the geometry is represented by the 2×2 resolution. In the case of the example of FIG. 6, since there are only three vertices (black squares) in the geometry image 111, the encoding efficiency can be improved without reducing the quality (without reducing the number of vertices) even with the resolution of 2×2. The same applies to the case of the texture.

In this case, coordinates of the vertex positions can be expressed by the following Expressions (16) and (17).

$$(x\_g2, y\_g2, w\_g2, h\_g2) = f(M - G2,\ offsetG2) \tag{16}$$

$$(x\_t2, y\_t2, w\_t2, h\_t2) = f(M - T2,\ offsetT2) \tag{17}$$

In the case where Method 1-4 is applied, for example, as illustrated in the eighth row from the top of the table in FIG. 4, the parameter T2 or the parameter G2 may be transmitted from the encoding device to the decoding device (Method 1-4-3). For example, in the information processing device, the provision unit may further provide information regarding the first size and the second size. Furthermore, in the information processing device, the acquisition unit may further acquire information regarding the first size from the bitstream, and the patch reconstruction unit may reconstruct the patches arranged in the effective region having the first size in the geometry image with the second granularity to have the first granularity on the basis of the information regarding the first size. Furthermore, in the information processing device, the acquisition unit may further acquire information regarding the second size from the bitstream, and the information processing device may further include a cutout unit that cuts out an effective region having the second size from the texture image with the third granularity on the basis of the information regarding the second size.

For example, the parameter T2 or the parameter G2 may be transmitted from the encoding device to the decoding device for each frame. In this manner, the encoding device can control the effective region of each frame independently of an actual image size. Hence, the encoding device can perform rate control of the bitstream by applying the effective region.

<Processing of Overlapping Points>

Figure 7:
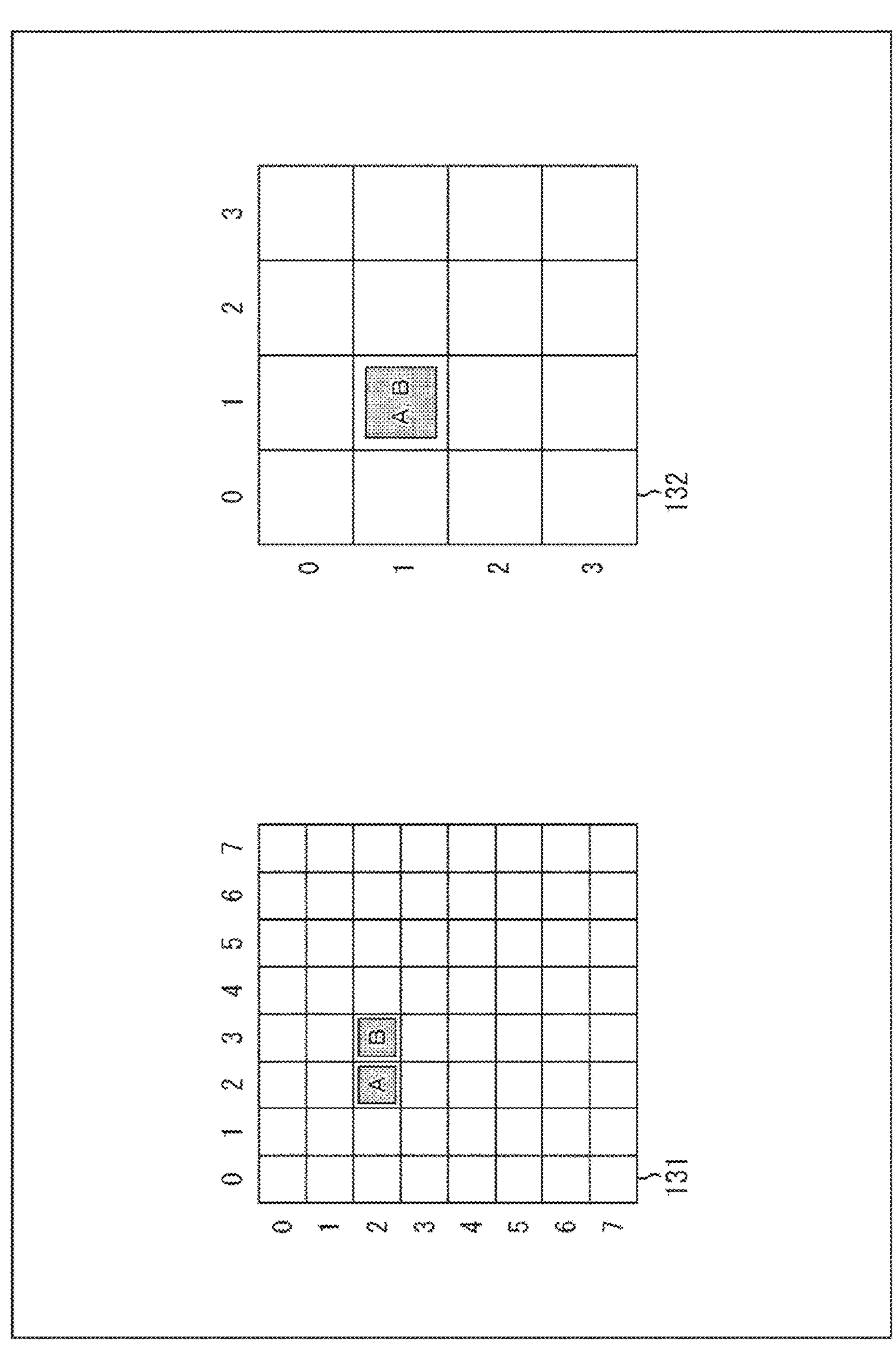
FIG. 7 is a diagram for describing overlapping points.
Figure 8:
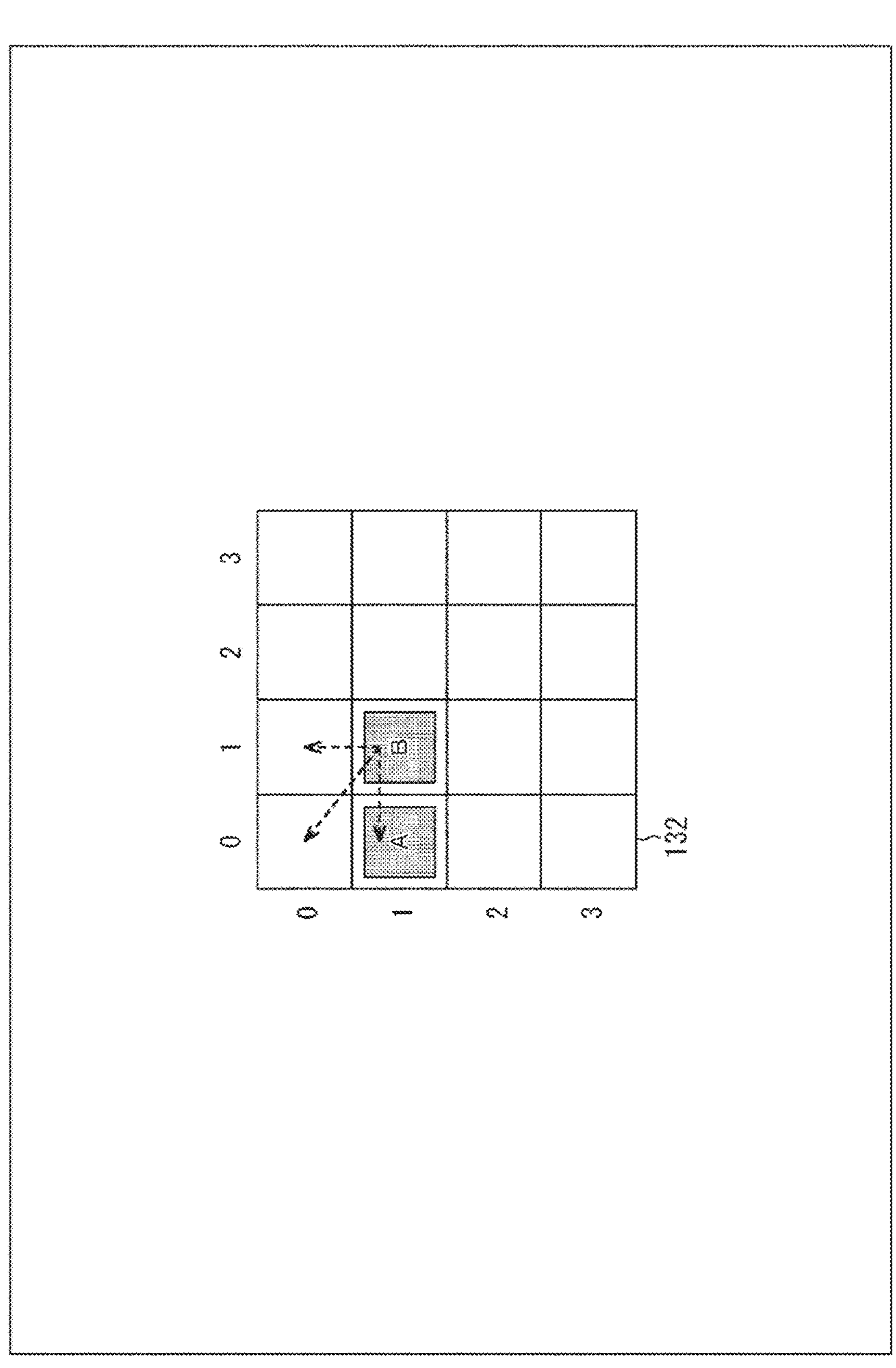
FIG. 8 is a diagram for describing the overlapping points.

In the case where the resolution of the geometry image is reduced by applying the above-described present technology, there is a possibility that a plurality of vertices will be arranged at the same position (same coordinate) of the geometry image. The plurality of vertices arranged at the same position as described above is also referred to as overlapping points. For example, in a case where a resolution of a geometry image 131 in FIG. 7 is reduced, a vertex A (2, 2) and a vertex B (3, 2) arranged in the geometry image 131 are arranged at the same position (1, 1) in the geometry image 132 with the reduced resolution. In the case where Method 1 is applied, for example, as illustrated in the ninth row from the top of the table in FIG. 4, for example, predetermined processing may be performed on such overlapping points of the geometry (Method 1-5).

In the case where Method 1-5 is applied, for example, as illustrated in the tenth row from the top of the table in FIG. 4, an average value or a mode value of pixel values of the overlapping points may be applied (Method 1-5-1). For example, in the information processing device, in a case where a plurality of vertices is arranged at the same position, that is, at a single position, in generation of the geometry image based on the second granularity, the geometry image generation unit may apply, as a pixel value of the position, an average value or a mode value of pixel values corresponding to the plurality of respective vertices. Furthermore, the pixel values may be derived using a predetermined resolution conversion algorithm.

Furthermore, in the case where Method 1-5 is applied, for example, as illustrated in the eleventh row from the top of the table in FIG. 4, the overlapping points may be arranged (moved) to neighboring pixels (Method 1-5-2). For example, in the case where the vertex A and the vertex B are arranged at the same position as illustrated in FIG. 7, one of the vertex A and the vertex B (for example, the vertex A) may be moved to an adjacent pixel (for example, (0,0), (0,1), or (1,0)) as indicated by dotted arrows. This movement of the pixel values is performed in accordance with a predetermined algorithm.

At the time of decoding, the generation of the overlapping points is detected using vertex information with a granularity M, the same algorithm as that used at the time of encoding is applied to the overlapping points to identify the movement of the pixel values, and it is sufficient if the moved pixel values are restored to the original values.

For example, in the information processing device, in a case where the plurality of vertices is arranged at the same position, that is, at a single position, in generation of the geometry image based on the second granularity, the geometry image generation unit may arrange the plurality of vertices at different pixels, respectively, with the same position as a reference. In other words, with the same position as a reference, the plurality of vertices is arranged in different pixels, respectively. More specifically, based on a reference position, one of the plurality of vertices is disposed in a pixel at the reference position, and another vertex is disposed in a pixel at a position different from the reference position. Furthermore, in the information processing device, the patch reconstruction unit may return a vertex moved from a pixel to another pixel when the geometry image with the second granularity is encoded to the original pixel before corresponding movement and reconstruct the plurality of patches of the geometry image to have the first granularity.

Furthermore, in the case where Method 1-5 is applied, for example, as illustrated in the twelfth row from the top of the table in FIG. 4, information regarding the overlapping points may be separately transmitted (Method 1-5-3). For example, the information regarding the overlapping points may be transmitted on a patch basis. For example, in the information processing device, the geometry image generation unit may generate information regarding overlapping points which are the plurality of vertices arranged at the same position in generation of the geometry image based on the second granularity, the geometry image encoding unit may generate encoded data of the information regarding the overlapping points, and the provision unit may provide the encoded data of the information regarding the overlapping points. Furthermore, in the information processing device, the acquisition unit may acquire, from the bitstream, the information regarding the overlapping points which are the plurality of vertices arranged at the same position in the geometry image with the second granularity, and the patch reconstruction unit may reconstruct the plurality of patches of the geometry image with the second granularity to have the first granularity on the basis of the information regarding the overlapping points.

Figure 9:
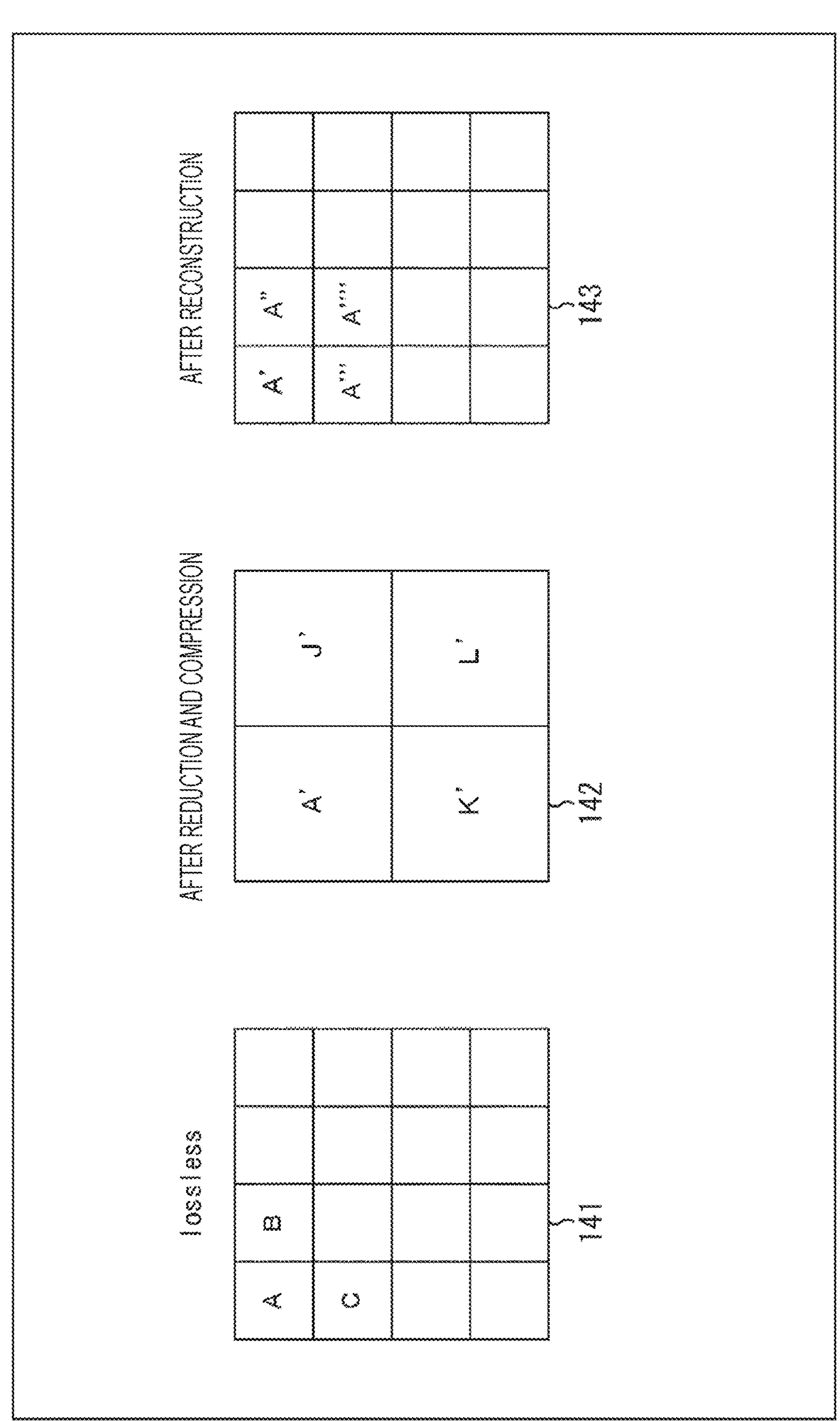
FIG. 9 is a diagram for describing other overlapping points.

Furthermore, in the case where Method 1-5 is applied, for example, as illustrated in the bottom row of the table in FIG. 4, surrounding pixel values may be adjusted in accordance with the interpolation method (Method 1-5-4). For example, as illustrated in FIG. 9, it is assumed that there are a pixel value A, a pixel value B, and a pixel value C in a 4×4 geometry image 141 before encoding. Then, it is assumed that a 2×2 geometry image 142 is obtained after reduction and compression. The geometry image 142 has a pixel value A', a pixel value J', a pixel value K', and a pixel value L'. Then, it is assumed that a geometry image 143 is obtained after reconstruction. In the geometry image 143, a pixel having the pixel value A in the geometry image 141 has the pixel value A', a pixel having the pixel value B therein has a pixel value A", and a pixel having the pixel value C therein has a pixel value A'".

Then, in a case where these pixel values are generated with reference to the pixel value J', the pixel value K', and the pixel value L' of the geometry image 142, the pixel value J', the pixel value K', and the pixel value L' in the geometry image 142 may be corrected such that the pixel value A' approximates the pixel value A, the pixel value A" approximates the pixel value B, and the pixel value A'" approximates the pixel value C.

In other words, in the information processing device, in the case where the plurality of vertices is arranged at the same position (that is, the single position) based on the second granularity, the geometry image generation unit may correct surrounding pixel values to reduce an error in interpolation processing of the plurality of vertices during decoding. Here, the surrounding pixel values may be regarded as values of one or more pixels adjacent to the single position. Furthermore, in the information processing device, the patch reconstruction unit may reconstruct the plurality of patches of the geometry image with the second granularity to have the first granularity by interpolating the plurality of vertices on the basis of the surrounding pixel values around the single position where the plurality of vertices is arranged in the geometry image with the second granularity.

3. First Embodiment

<Encoding Device>

Figure 10:
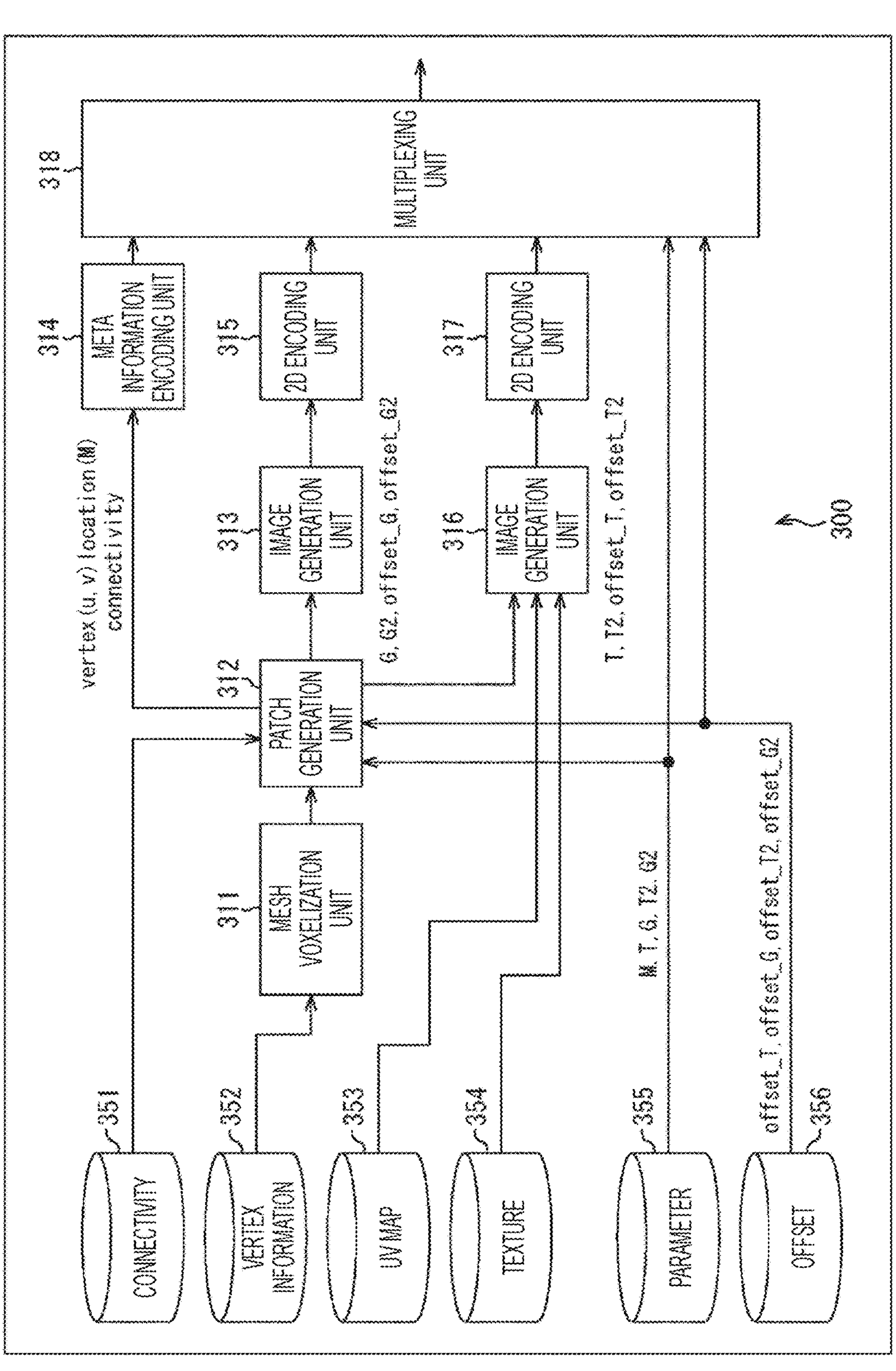
FIG. 10 is a block diagram illustrating a main configuration example of an encoding device.

The present technology described above can be applied to any device. For example, the present technology can be applied to an encoding device 300 as illustrated in FIG. 10. FIG. 10 is a block diagram illustrating an example of a configuration of an encoding device which is an embodiment of an information processing device to which the present technology is applied. The encoding device 300 illustrated in FIG. 10 is a device that extends VPCC and encodes 3D data using Mesh as a video frame by an encoding method for two-dimensional images. At that time, the encoding device 300 performs encoding by applying a single method or a combination of a plurality of methods among the above-described various methods of the present technology.

Note that, in FIG. 10, main processing units, main data flows, and the like are illustrated, and those illustrated in FIG. 10 are not necessarily all. That is, in the encoding device 300, there may be a processing unit not illustrated as a block in FIG. 10, or there may be a process or a data flow not illustrated as an arrow and the like in FIG. 10.

As illustrated in FIG. 10, the encoding device 300 includes a mesh voxelization unit 311, a patch generation unit 312, an image generation unit 313, a meta information encoding unit 314, a 2D encoding unit 315, an image generation unit 316, a 2D encoding unit 317, and a multiplexing unit 318.

Connectivity 351, vertex information 352, a UV map 353, and a texture 354 are supplied to the encoding device 300 as 3D data using the mesh.

The connectivity 351 is information similar to the connectivity 32 (FIG. 2), and indicates each vertex (each vertex connected to each other) forming a polygon for each polygon. The vertex information 352 is information similar to the vertex information 31 (FIG. 2) and indicates coordinates of each vertex forming the mesh. The UV map 353 is information similar to the UV map 34 (FIG. 2) and indicates the position of each vertex on the texture image. The texture 354 is information similar to the texture image 33 (FIG. 2) and indicates the texture to be pasted on the polygon. That is, the texture 354 is information including a texture image.

Furthermore, a parameter 355 and an offset 356 are supplied to the encoding device 300. The parameter 355 can include any parameter. For example, the parameter 355 can include the parameter M, the parameter T, the parameter T2, and the parameter G2 described above. The offset 365 may include any offset value. For example, the offset 365 may include offset_T which is an offset value used for a calculation using the parameter T, offset_G which is an offset value used for a calculation using the parameter G, offset_T2 which is an offset value used for a calculation using the parameter T2, and offset_G2 which is an offset value used for a calculation using the parameter G2.

The mesh voxelization unit 311 acquires the vertex information 352 supplied to the encoding device 300. The mesh voxelization unit 311 converts the coordinates of each vertex included in the acquired vertex information 352 into a voxel grid. The mesh voxelization unit 311 supplies the vertex information 352 of the voxel grid after the conversion to the patch generation unit 312.

The patch generation unit 312 acquires the connectivity 351 and the UV map 353 supplied to the encoding device 300. Furthermore, the patch generation unit 312 acquires the parameter 355 and the offset 366 which are supplied to the encoding device 300. Furthermore, the patch generation unit 312 acquires the vertex information 352 of the voxel grid supplied from the mesh voxelization unit 311. Regarding the patch generation unit 312, furthermore, on the basis of these items of information, the patch generation unit 312 projects the patches of the generated geometry on a projection plane and generates patch images. The patch generation unit 312 generates the patch images of the geometry with the granularity corresponding to the parameter G.

The patch generation unit 312 supplies information such as the connectivity 351 and the vertex list to the meta information encoding unit 314 as meta information. The vertex coordinates of this vertex list have the granularity corresponding to the parameter M. Moreover, the patch generation unit 312 supplies the generated patch images, the parameter 355, and the offset 356 to the image generation unit 313 and the image generation unit 316.

The image generation unit 313 acquires the patch images, the parameter 355, and the offset 356 supplied from the patch generation unit 312. The image generation unit 313 arranges the patch images on a two-dimensional plane and generates a geometry image. At that time, the image generation unit 313 generates a geometry image with the granularity (effective region G2) corresponding to the parameter G by using the parameter G and the offset_G (the parameter G2 and the offset_G2) by applying the above-described Method 1-1. That is, the image generation unit 313 generates the geometry image with the second granularity. That is, the image generation unit 313 can also be referred to as the geometry image generation unit. Note that the image generation unit 313 may arrange the plurality of patches of the geometry within the effective region having the first size in the geometry image by applying the above-described Method 1-4-1. Furthermore, in a case where a plurality of vertices is arranged at the same position in generation of the geometry image based on the second granularity, the image generation unit 313 may apply, as a pixel value of the position, an average value or a mode value of pixel values corresponding to the plurality of respective vertices by applying the above-described Method 1-5-1. Furthermore, in a case where the plurality of vertices is arranged at the same position in generation of the geometry image based on the second granularity, the image generation unit 313 may arrange the plurality of vertices at different pixels, respectively, with the same position as a reference by applying the above-described Method 1-5-2. Furthermore, the image generation unit 313 may generate information regarding overlapping points which are the plurality of vertices arranged at the same position in generation of the geometry image based on the second granularity by applying the above-described Method 1-5-3. Furthermore, in the case where the plurality of vertices is arranged at the same position in generation of the geometry image based on the second granularity, the image generation unit 313 may correct surrounding pixel values around the same position during decoding to reduce an error in interpolation processing of the plurality of vertices based on the surrounding pixel values by applying the above-described Method 1-5-4. The image generation unit 313 supplies the generated geometry image as a geometry video frame to the 2D encoding unit 315.

The meta information encoding unit 314 acquires the meta information (including the connectivity 351, the vertex list of the granularity corresponding to the parameter M, or the like) supplied from the patch generation unit 312. The meta information encoding unit 314 encodes the acquired meta information to generate encoded data of the meta information by applying the above-described Method 1. That is, the meta information encoding unit 314 encodes the meta information including the vertex information with the first granularity which indicates coordinates of vertices of a mesh representing an object having a three-dimensional structure, and generates the encoded data of the meta information. The meta information encoding unit 314 supplies the generated encoded data of the meta information to the multiplexing unit 318.

The 2D encoding unit 315 acquires the geometry image supplied from the image generation unit 313. The 2D encoding unit 315 encodes the acquired geometry image by an encoding method for 2D images and generates encoded data of the geometry image by applying the above-described Method 1. That is, the 2D encoding unit 315 encodes the geometry image with the second granularity set independently of the first granularity in which a plurality of patches obtained by dividing the geometry of the mesh is arranged, and generates the encoded data of the geometry image. That is, the 2D encoding unit 315 can also be referred to as the geometry image encoding unit. Note that the 2D encoding unit 315 may encode the geometry image generated by the image generation unit 313 by applying the above-described Method 1-1. Furthermore, the 2D encoding unit 315 may encode the information regarding the overlapping points generated by the image generation unit 313 and generate encoded data thereof by applying the above-described Method 1-5-3. The 2D encoding unit 315 supplies the generated encoded data of the geometry image to the multiplexing unit 318.

The image generation unit 316 acquires the patch images, the parameter 355, and the offset 356 supplied from the patch generation unit 312. Furthermore, the image generation unit 316 acquires the UV map 353 and the texture 354. The image generation unit 316 generates a texture image using these items of information. At that time, the image generation unit 316 generates the texture image with a granularity (effective region T12) corresponding to the parameter T by using the parameter T and the offset_T (the parameter T2 and the offset_T2) by applying the above-described Method 1-1. That is, the image generation unit 316 generates the texture image with the third granularity. That is, the image generation unit 316 can also be referred to as the texture image generation unit. Note that the image generation unit 316 may arrange the plurality of patches of the texture within the effective region having the second size in the texture image by applying the above-described Method 1-4-1. The image generation unit 316 supplies the generated texture image as a texture video frame to the 2D encoding unit 317.

The 2D encoding unit 317 acquires the texture image supplied from the image generation unit 316. The 2D encoding unit 317 encodes the acquired texture image by the encoding method for 2D images and generates encoded data of the texture image by applying the above-described Method 1. That is, the 2D encoding unit 317 encodes the texture image with the third granularity set independently of the first granularity in which the plurality of patches obtained by dividing the texture of the mesh is arranged, and generates the encoded data of the texture image. That is, the 2D encoding unit 317 can also be referred to as the texture image encoding unit. Note that the 2D encoding unit 317 may encode the texture image generated by the image generation unit 316 by applying the above-described Method 1-1. The 2D encoding unit 317 supplies the generated encoded data of the texture image to the multiplexing unit 318.

The multiplexing unit 318 acquires and multiplexes the supplied meta information, the encoded data of the geometry image, the encoded data of the texture image, the parameter 355, and the offset 356 and generates one bitstream by applying the above-described Method 1. The multiplexing unit 318 provides the generated bitstream to another device. That is, the multiplexing unit 318 provides the encoded data of the meta information, the encoded data of the geometry image, and the encoded data of the texture image. That is, the multiplexing unit 318 can also be referred to as the provision unit. Note that the multiplexing unit 318 may further store the granularity information regarding the first granularity, the second granularity, and the third granularity in the bitstream, or the like, and provide the granularity information to another device by applying the above-described Method 1-3. Furthermore, the multiplexing unit 318 may further store information regarding the first size and the second size in the bitstream, or the like, and provide the information to another device by applying the above-described Method 1-4-3. Furthermore, the multiplexing unit 318 may further store the encoded data of the information regarding the overlapping points generated by the 2D encoding unit 315 in the bitstream, or the like, and provide the encoded data to another device by applying the above-described Method 1-5-3.

By providing the above-described configuration, the encoding device 300 can independently control the granularities of the UV coordinates and the vertex positions. It is needless to say that any methods described above in <2. Control of Granularities of UV Map and Vertex Coordinates> may be applied to the encoding device 300. Furthermore, any combination of a plurality of methods described above in <2. Control of Granularities of UV Map and Vertex Coordinates> may be applied to the encoding device 300.

Note that these processing units (mesh voxelization unit 311 to the multiplexing unit 318) have any configurations, respectively. For example, each of the processing units may include a logic circuit that achieves the above-described processing. Furthermore, each of the processing units may include, for example, a central processing unit (CPU), a read only memory (ROM), a random access memory (RAM), and the like, and execute a program by using the CPU, the ROM, the RAM, and the like, thereby implementing the above-described processing. Needless to say, each processing unit may have both the configurations, and a part of the above-described processing may be achieved by a logic circuit and another may be achieved by executing the program. The configurations of the processing units may be independent of each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Flow of Encoding Process>

Figure 11:
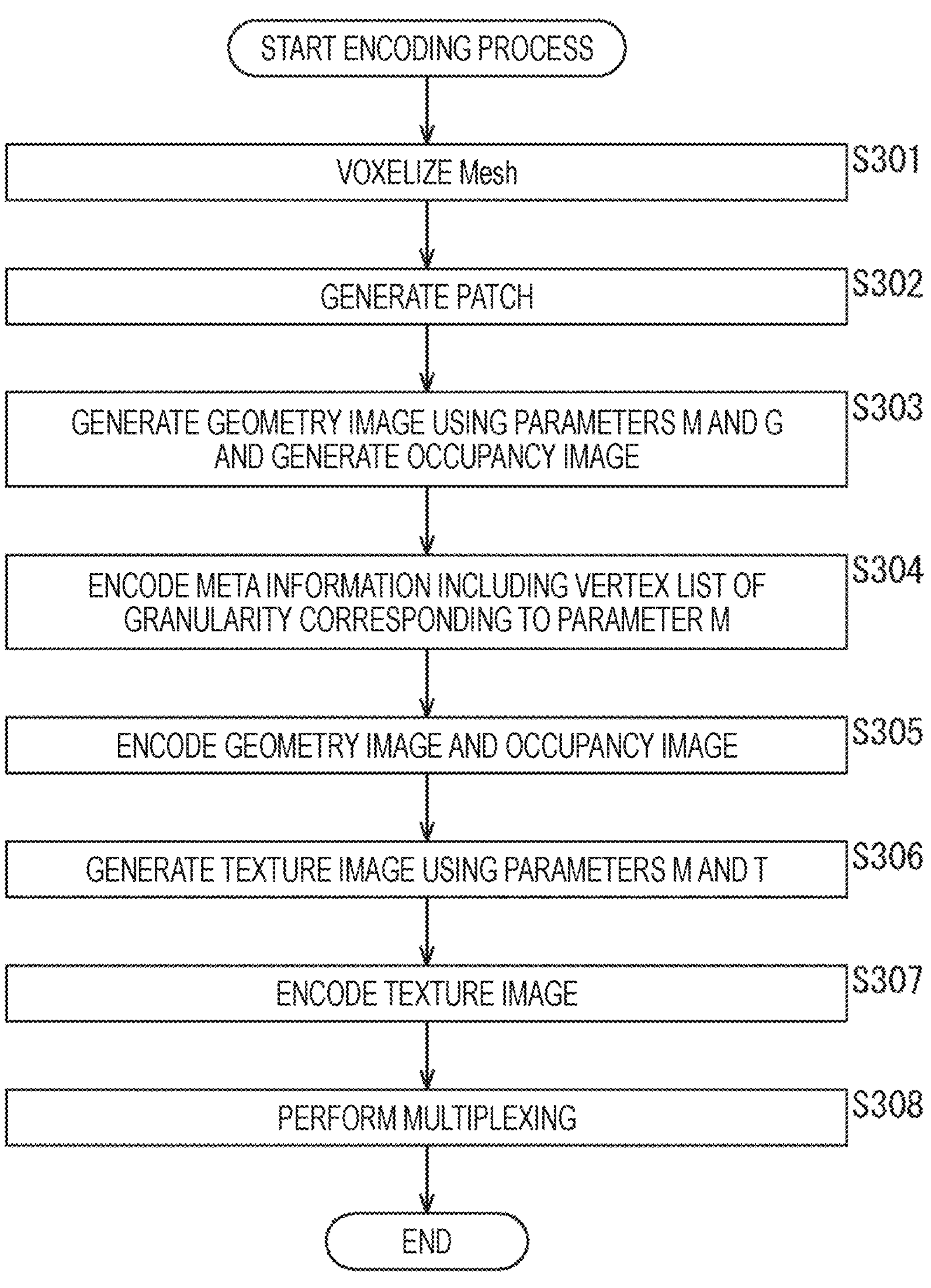
FIG. 11 is a flowchart illustrating an example of a flow of an encoding process.

An example of a flow of an encoding process executed by the encoding device 300 will be described with reference to a flowchart in FIG. 11.

When the encoding process is started, in step S301, the mesh voxelization unit 311 voxelizes the coordinates of vertices included in the vertex information 352 to voxelize the mesh.

In step S302, the patch generation unit 312 generates patches by using the vertex information 352 and the like voxelized in step S301, projects the generated patches on the projection plane, and generates patch images.

In step S303, the image generation unit 313 generates a geometry image with the granularity corresponding to the parameter G by using the parameter M and the parameter G. At that time, the image generation unit 313 generates a geometry image with the granularity (effective region G2) corresponding to the parameter G by using the parameter G and the offset_G (the parameter G2 and the offset_G2) by applying the above-described Method 1-1. That is, the image generation unit 313 generates the geometry image with the second granularity.

Note that the image generation unit 313 may arrange the plurality of patches of the geometry within the effective region having the first size in the geometry image by applying the above-described Method 1-4-1. Furthermore, in a case where a plurality of vertices is arranged at the same position in generation of the geometry image based on the second granularity, the image generation unit 313 may apply, as a pixel value of the position, an average value or a mode value of pixel values corresponding to the plurality of respective vertices by applying the above-described Method 1-5-1. Furthermore, in a case where the plurality of vertices is arranged at the same position in generation of the geometry image based on the second granularity, the image generation unit 313 may arrange the plurality of vertices at different pixels, respectively, with the same position as a reference by applying the above-described Method 1-5-2. Furthermore, the image generation unit 313 may generate information regarding overlapping points which are the plurality of vertices arranged at the same position in generation of the geometry image based on the second granularity by applying the above-described Method 1-5-3. Furthermore, in the case where the plurality of vertices is arranged at the same position in generation of the geometry image based on the second granularity, the image generation unit 313 may correct surrounding pixel values around the same position during decoding to reduce an error in interpolation processing of the plurality of vertices based on the surrounding pixel values by applying the above-described Method 1-5-4.

In step S304, the meta information encoding unit 314 encodes the meta information including the vertex list of the granularity corresponding to the parameter M and generates encoded data of the meta information by applying the above-described Method 1. That is, the meta information encoding unit 314 encodes the meta information including the vertex information with the first granularity which indicates coordinates of vertices of a mesh representing an object having a three-dimensional structure, and generates the encoded data of the meta information.

In step S305, the 2D encoding unit 315 encodes the geometry image generated in step S303 by an encoding method for 2D images and generates encoded data of the geometry image by applying the above-described Method 1. That is, the 2D encoding unit 315 encodes the geometry image with the second granularity set independently of the first granularity in which a plurality of patches obtained by dividing the geometry of the mesh is arranged, and generates the encoded data of the geometry image. Note that the 2D encoding unit 315 may encode the geometry image generated by the image generation unit 313 by applying the above-described Method 1-1. Furthermore, the 2D encoding unit 315 may encode the information regarding the overlapping points generated by the image generation unit 313 and generate encoded data thereof by applying the above-described Method 1-5-3.

In step S306, the image generation unit 316 generates a texture image with the granularity corresponding to the parameter T by using the parameter M and the parameter T. At that time, the image generation unit 316 generates the texture image with a granularity (effective region T12) corresponding to the parameter T by using the parameter T and the offset_T (the parameter T2 and the offset_T2) by applying the above-described Method 1-1. That is, the image generation unit 316 generates the texture image with the third granularity. Note that the image generation unit 316 may arrange the plurality of patches of the texture within the effective region having the second size in the texture image by applying the above-described Method 1-4-1.

In step S307, the 2D encoding unit 317 encodes the texture image generated in step S306 and generates encoded data of the texture image by applying the above-described Method 1. That is, the 2D encoding unit 317 encodes the texture image with the third granularity set independently of the first granularity in which the plurality of patches obtained by dividing the texture of the mesh is arranged, and generates the encoded data of the texture image. Note that the 2D encoding unit 317 may encode the texture image generated by the image generation unit 316 by applying the above-described Method 1-1.

In step S308, the multiplexing unit 318 multiplexes the encoded data of the meta information, the encoded data of the geometry image, the encoded data of the texture image, the parameter 355, and the offset 356 and generates one bitstream by applying the above-described Method 1. Then, the multiplexing unit 318 provides the generated bitstream to another device. That is, the multiplexing unit 318 provides the encoded data of the meta information, the encoded data of the geometry image, and the encoded data of the texture image. Note that the multiplexing unit 318 may further store the granularity information regarding the first granularity, the second granularity, and the third granularity in the bitstream, or the like, and provide the granularity information to another device by applying the above-described Method 1-3. Furthermore, the multiplexing unit 318 may further store information regarding the first size and the second size in the bitstream, or the like, and provide the information to another device by applying the above-described Method 1-4-3. Furthermore, the multiplexing unit 318 may further store the encoded data of the information regarding the overlapping points generated by the 2D encoding unit 315 in the bitstream, or the like, and provide the encoded data to another device by applying the above-described Method 1-5-3.

When the process of step S308 ends, the encoding process ends.

By executing the above-described processes, the encoding device 300 can independently control the granularities of the UV coordinates and the vertex positions. It is needless to say that any methods described above in <2. Control of Granularities of UV Map and Vertex Coordinates> may be applied to the encoding process. Furthermore, any combination of the plurality of methods described above in <2. Control of Granularities of UV Map and Vertex Coordinates> may be applied to the encoding process.

4. Second Embodiment

<Decoding Device>

Figure 12:
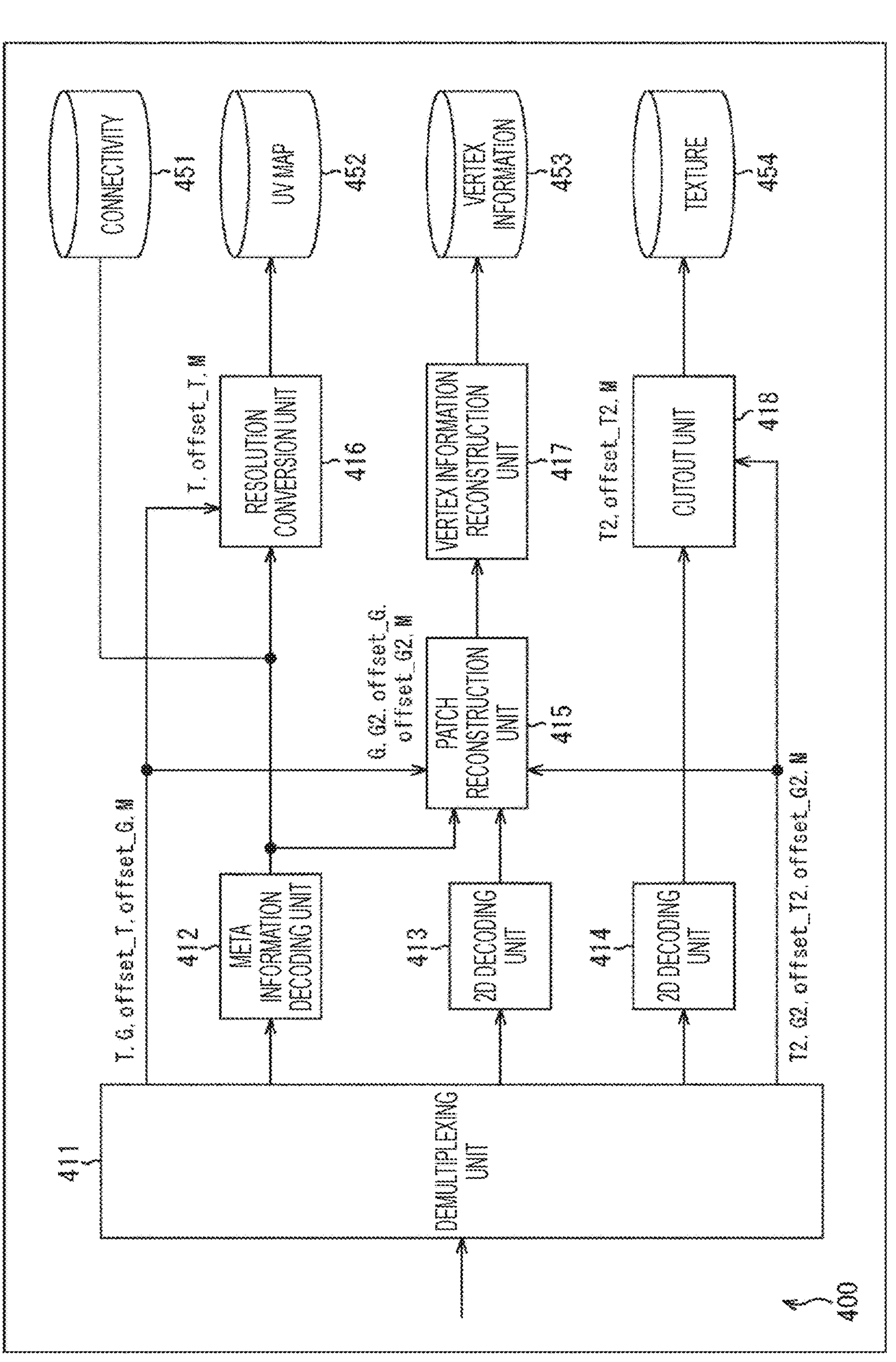
FIG. 12 is a block diagram illustrating a main configuration example of a decoding device.

The present technology can also be applied to, for example, a decoding device 400 as illustrated in FIG. 12. FIG. 12 is a block diagram illustrating an example of a configuration of a decoding device, which is an aspect of an image processing device to which the present technology is applied. A decoding device 400 illustrated in FIG. 12 is a device that decodes encoded data, obtained by extending VPCC and encoding 3D data using a mesh as a video frame by an encoding method for two-dimensional images, by a decoding method for two-dimensional images to generate (reconfigure) 3D data using a mesh. At that time, the decoding device 400 decodes the encoded data and reconstructs the 3D data by applying a single method or a combination of a plurality of methods among the various methods of the present technology described above.

Note that, in FIG. 12, main parts of processing units, data flows, and the like are illustrated, and those illustrated in FIG. 12 are not necessarily all. That is, in the decoding device 400, there may be a processing unit not illustrated as a block in FIG. 12, or there may be a process or a data flow not illustrated as an arrow or the like in FIG. 12.

As illustrated in FIG. 12, the decoding device 400 includes a demultiplexing unit 411, a meta information decoding unit 412, a 2D decoding unit 413, a 2D decoding unit 414, a patch reconstruction unit 415, a resolution conversion unit 416, a vertex information reconstruction unit 417, and a cutout unit 418.

The demultiplexing unit 411 acquires a bitstream input to the decoding device 400. As described above in the first embodiment, this bitstream is, for example, a bitstream generated by the encoding device 300, and 3D data using a mesh is encoded by extending the VPCC.

The demultiplexing unit 411 demultiplexes the bitstream and acquires (generates) items of encoded data included in the bitstream by applying the above-described Method 1. For example, the demultiplexing unit 411 acquires, from the bitstream, the encoded data of the meta information, the encoded data of the geometry image, the encoded data of the texture image, the parameter 355, and the offset 356. That is, the demultiplexing unit 411 acquires, from a bitstream of a mesh representing an object having a three-dimensional structure, encoded data of meta information including vertex information with the first granularity which indicates coordinates of vertices of the mesh, encoded data of a geometry image with the second granularity set independently of the first granularity in which a plurality of patches obtained by dividing a geometry of the mesh is arranged, and a texture image with the third granularity set independently of the first granularity in which a plurality of patches obtained by dividing a texture of the mesh is arranged. Hence, the demultiplexing unit 411 can also be referred to as the acquisition unit. Note that the demultiplexing unit 411 may acquire, from the bitstream, the granularity information regarding the first granularity, the second granularity, and the third granularity by applying the above-described Method 1-3. Furthermore, the demultiplexing unit 411 may further acquire, from the bitstream, the information regarding the first size or the information regarding the second size by applying the above-described Method 1-4-2 or 1-4-3. Furthermore, the demultiplexing unit 411 may acquire, from the bitstream, the information regarding the overlapping points which are the plurality of vertices arranged at the same position in the geometry image with the second granularity by applying the above-described Method 1-5-3.

The demultiplexing unit 411 supplies the encoded data of the meta information to the meta information decoding unit 412. Furthermore, the demultiplexing unit 411 supplies the encoded data of the geometry image to the 2D decoding unit 413. Furthermore, the demultiplexing unit 411 supplies the encoded data of the texture image to the 2D decoding unit 414. Furthermore, the demultiplexing unit 411 supplies the parameter 355 and the offset 356 to the patch reconstruction unit 415, the resolution conversion unit 416, and the cutout unit 418.

The meta information decoding unit 412 acquires the encoded data of the meta information supplied from the demultiplexing unit 411. The meta information decoding unit 412 decodes the encoded data of the meta information and generates meta information by applying the above-described Method 1. The meta information includes connectivity 451 or a vertex list of the granularity corresponding to the parameter M. That is, the meta information decoding unit 412 decodes the encoded data of the meta information and generates meta information including the vertex information with the first granularity. The meta information decoding unit 412 outputs the generated connectivity 451 as (data constituting) 3D data using the restored mesh to the outside of the decoding device 400. Furthermore, the meta information decoding unit 412 supplies the generated meta information to the patch reconstruction unit 415 or the resolution conversion unit 416.

The 2D decoding unit 413 acquires the encoded data of the geometry image supplied from the demultiplexing unit 411. The 2D decoding unit 413 decodes the encoded data of the geometry image by a decoding method for 2D images and generates a geometry image by applying the above-described Method 1. That is, the 2D decoding unit 413 decodes the encoded data of the geometry image with the second granularity and generates a geometry image with the second granularity. The 2D decoding unit 413 supplies the generated geometry image to the patch reconstruction unit 415.

The 2D decoding unit 414 acquires the encoded data of the texture image supplied from the demultiplexing unit 411. The 2D decoding unit 414 decodes the acquired encoded data of the texture image by the decoding method for 2D images and generates a texture image by applying the above-described Method 1. That is, the 2D decoding unit 414 decodes the encoded data of the texture image with the third granularity and generates a texture image with the third granularity. The 2D decoding unit 414 supplies the generated texture image to the cutout unit 418.

The patch reconstruction unit 415 extracts patch images from the geometry image by using the meta information and the like and reconstructs patches corresponding to the extracted patch images. At that time, the patch reconstruction unit 415 reconstructs patches with the granularity corresponding to the parameter M by applying the above-described Method 1-2. That is, the patch reconstruction unit 415 reconstructs a plurality of patches arranged in the geometry image with the second granularity to have the first granularity on the basis of the vertex information with the first granularity and the granularity information regarding the first granularity, the second granularity, and the third granularity. Note that the patch reconstruction unit 415 may reconstruct the patches to have the first granularity, the patches being arranged in an effective region having the first size in the geometry image with the second granularity, on the basis of the information regarding the first size by applying Method 1-4-2 or 1-4-3. Furthermore, the patch reconstruction unit 415 may return a vertex moved from a pixel to another pixel when the geometry image with the second granularity is encoded to the original pixel before corresponding movement and reconstruct the plurality of patches of the geometry image to have the first granularity by applying the above-described Method 1-5-2. Furthermore, the patch reconstruction unit 415 may reconstruct the plurality of patches of the geometry image with the second granularity to have the first granularity on the basis of the information regarding the overlapping points by applying the above-described Method 1-5-3. Furthermore, the patch reconstruction unit 415 may reconstruct the plurality of patches of the geometry image with the second granularity to have the first granularity by interpolating a plurality of vertices on the basis of surrounding pixel values around the single position where the plurality of vertices is arranged in the geometry image with the second granularity by applying the above-described Method 1-5-4. The patch reconstruction unit 415 supplies the reconstructed patches or the used meta information (the connectivity 451, the UV map 452, and the like) to the vertex information reconstruction unit 417.

The resolution conversion unit 416 generates the UV map 452 including a vertex list of the granularity corresponding to the parameter M and UV coordinates with the granularity corresponding to the parameter T by using the parameter T and the offset_T by applying the above-described Method 1-2, the vertex list and the UV coordinates being included in the meta information supplied from the meta information decoding unit 412. That is, the resolution conversion unit 416 generates a UV map with the third granularity on the basis of the vertex information with the first granularity and the granularity information regarding the first granularity, the second granularity, and the third granularity. That is, the resolution conversion unit 416 can also be referred to as the UV map generation unit. The Resolution conversion unit 416 outputs the generated UV map 452 as (data constituting) 3D data using the restored mesh to the outside of the decoding device 400.

The vertex information reconstruction unit 417 acquires the patches or the meta information supplied from the patch reconstruction unit 415. The vertex information reconstruction unit 417 reconstructs vertices included in a region of patches from the acquired patches and generates vertex information 453 with the granularity corresponding to the parameter G by applying the above-described Method 1-2. That is, the vertex information reconstruction unit 417 reconstructs the vertex information to have the first granularity on the basis of the plurality of reconstructed patches. The vertex information reconstruction unit 417 outputs the generated vertex information 453 as (data constituting) 3D data using the restored mesh to the outside of the decoding device 400.

The cutout unit 418 cuts out an effective region from the texture image supplied from the 2D decoding unit 414 and generates a texture 454 by applying the above-described Method 1-4-2 or 1-4-3. That is, the cutout unit 418 cuts out an effective region having the second size from the texture image with the third granularity on the basis of the information regarding the second size. The cutout unit 418 outputs the texture 454 as (data constituting) 3D data using the restored mesh to the outside of the decoding device 400.

By providing the above-described configuration, the decoding device 400 can independently control the granularities of the UV coordinates and the vertex positions. It is needless to say that any method described above in <2. Control of Granularities of UV Map and Vertex Coordinates> may be applied to the decoding device 400. Furthermore, any combination of the plurality of methods described above in <2. Control of Granularities of UV Map and Vertex Coordinates> may be applied to the decoding device 400.

Note that these processing units (the demultiplexing unit 411 to the cutout unit 418) have any configurations, respectively. For example, each of the processing units may include a logic circuit that achieves the above-described processing. Furthermore, each of the processing units may include, for example, a CPU, a ROM, a RAM, and the like, and execute a program by using the CPU, the ROM, the RAM, and the like to achieve the above-described processing. Needless to say, each processing unit may have both the configurations, and a part of the above-described processing may be achieved by a logic circuit and another may be achieved by executing the program. The configurations of the processing units may be independent of each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Flow of Decoding Process>

Figure 13:
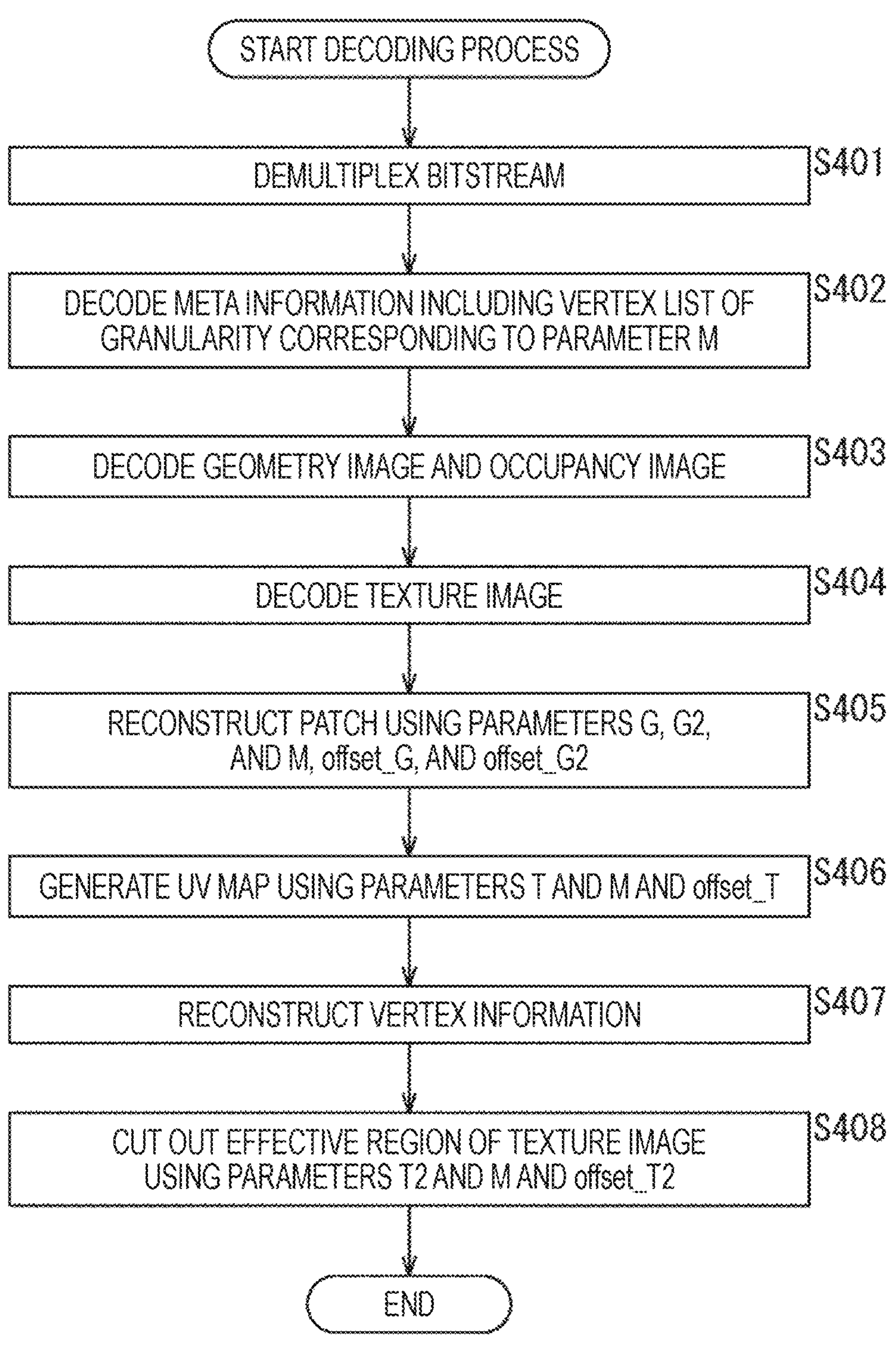
FIG. 13 is a flowchart illustrating an example of a flow of a decoding process.

An example of a flow of a decoding process executed by the decoding device 400 will be described with reference to a flowchart in FIG. 13.

When the decoding process is started, the demultiplexing unit 411 demultiplexes the bitstream input to the decoding device 400 in step S401 by applying the above-described Method 1. For example, the demultiplexing unit 411 acquires, from the bitstream, the encoded data of the meta information, the encoded data of the geometry image, the encoded data of the texture image, the parameter 355, and the offset 356. That is, the demultiplexing unit 411 acquires, from a bitstream of a mesh representing an object having a three-dimensional structure, encoded data of meta information including vertex information with the first granularity which indicates coordinates of vertices of the mesh, encoded data of a geometry image with the second granularity set independently of the first granularity in which a plurality of patches obtained by dividing a geometry of the mesh is arranged, and a texture image with the third granularity set independently of the first granularity in which a plurality of patches obtained by dividing a texture of the mesh is arranged. Note that the demultiplexing unit 411 may acquire, from the bitstream, the granularity information regarding the first granularity, the second granularity, and the third granularity by applying the above-described Method 1-3. Furthermore, the demultiplexing unit 411 may further acquire, from the bitstream, the information regarding the first size or the information regarding the second size by applying the above-described Method 1-4-2 or 1-4-3. Furthermore, the demultiplexing unit 411 may acquire, from the bitstream, the information regarding the overlapping points which are the plurality of vertices arranged at the same position in the geometry image with the second granularity by applying the above-described Method 1-5-3.

In step S402, the meta information decoding unit 412 decodes the encoded data of the meta information acquired from the bitstream in step S401 and generates (restores) the meta information including the vertex list of the granularity corresponding to the parameter M by applying the above-described Method 1. That is, the meta information decoding unit 412 decodes the encoded data of the meta information and generates meta information including the vertex information with the first granularity. The meta information decoding unit 412 outputs the generated connectivity 451 as (data constituting) 3D data using the restored mesh to the outside of the decoding device 400. Furthermore, the meta information decoding unit 412 supplies the generated meta information to the patch reconstruction unit 415 or the resolution conversion unit 416.

In step S403, the 2D decoding unit 413 decodes the encoded data of the geometry image extracted from the bitstream by the decoding method for 2D images in step S401 and generates (restores) a geometry image, by applying the above-described Method 1. That is, the 2D decoding unit 413 decodes the encoded data of the geometry image with the second granularity and generates a geometry image with the second granularity.

In step S404, the 2D decoding unit 414 decodes the encoded data of the texture image extracted from the bitstream by the decoding method for 2D images in step S401 and generates (restores) a texture image (the texture 454), by applying the above-described Method 1. That is, the 2D decoding unit 414 decodes the encoded data of the texture image with the third granularity and generates a texture image with the third granularity.

In step S405, the patch reconstruction unit 415 reconstructs patches with the granularity corresponding to the parameter M by using the parameter G, the parameter G2, the offset_G, the offset_G2, and the parameter M by applying the above-described Method 1-2. That is, the patch reconstruction unit 415 reconstructs a plurality of patches arranged in the geometry image with the second granularity to have the first granularity on the basis of the vertex information with the first granularity and the granularity information regarding the first granularity, the second granularity, and the third granularity. Note that the patch reconstruction unit 415 may reconstruct the patches to have the first granularity, the patches being arranged in an effective region having the first size in the geometry image with the second granularity, on the basis of the information regarding the first size by applying Method 1-4-2 or 1-4-3. Furthermore, the patch reconstruction unit 415 may return a vertex moved from a pixel to another pixel when the geometry image with the second granularity is encoded to the original pixel before corresponding movement and reconstruct the plurality of patches of the geometry image to have the first granularity by applying the above-described Method 1-5-2. Furthermore, the patch reconstruction unit 415 may reconstruct the plurality of patches of the geometry image with the second granularity to have the first granularity on the basis of the information regarding the overlapping points by applying the above-described Method 1-5-3. Furthermore, the patch reconstruction unit 415 may reconstruct the plurality of patches of the geometry image with the second granularity to have the first granularity by interpolating a plurality of vertices on the basis of surrounding pixel values around the single position where the plurality of vertices is arranged in the geometry image with the second granularity by applying the above-described Method 1-5-4.

In step S406, the resolution conversion unit 416 generates a UV map by using the parameter T, the offset_T, and the parameter M. For example, the resolution conversion unit 416 generates the UV map 452 including a vertex list of the granularity corresponding to the parameter M and UV coordinates with the granularity corresponding to the parameter T by using the parameter T and the offset_T by applying the above-described Method 1-2, the vertex list and the UV coordinates being included in the meta information supplied from the meta information decoding unit 412. That is, the resolution conversion unit 416 generates a UV map with the third granularity on the basis of the vertex information with the first granularity and the granularity information regarding the first granularity, the second granularity, and the third granularity.

In step S407, the vertex information reconstruction unit 417 reconstructs vertices included in a region of patches from the patches reconstructed in step S405 and generates the vertex information 453 by applying the above-described Method 1-2. That is, the vertex information reconstruction unit 417 reconstructs the vertex information to have the first granularity on the basis of the plurality of reconstructed patches.

In step S408, the cutout unit 418 cuts out the effective region from the texture image supplied from the 2D decoding unit 414 and generates the texture 454 by applying the above-described Method 1-4-2 or 1-4-3. That is, the cutout unit 418 cuts out an effective region having the second size from the texture image with the third granularity on the basis of the information regarding the second size. For example, the cutout unit 418 cuts out the effective region of the texture image by using the parameter T2, the offset_T2, and the parameter M.

When the processing of step S408 ends, the decoding process ends.

By executing the above-described processes, the decoding device 400 can independently control the granularities of the UV coordinates and the vertex positions. It is needless to say that any methods described above in <2. Control of Granularities of UV Map and Vertex Coordinates> may be applied to the decoding process. Furthermore, any combination of the plurality of methods described above in <2. Control of Granularities of UV Map and Vertex Coordinates> may be applied to the decoding process.

5. Supplementary Note

In the above description, a case where 3D data using a mesh is encoded by extending the standard called VPCC has been described, but Visual Volumetric Video-based Coding (V3C) or metadata immersive video (MIV) may be applied instead of VPCC. V3C and MIV are standards using substantially similar encoding technique as VPCC, and can be extended similarly to the case of VPCC to encode 3D data using a mesh. Hence, the above-described present technology can also be applied to a case where V3C or MIV is applied to encoding of 3D data using a mesh.

<3D Data>

Although the case where the present technology is applied to mesh encoding/decoding has been described above, the present technology is not limited to these examples, and can be applied to encoding/decoding of 3D data of an arbitrary standard. That is, as long as there is no contradiction with the present technology described above, specifications of various processes such as an encoding/decoding method and various types of data such as 3D data and metadata are arbitrary. Furthermore, in so far as there is no conflict with the present technology, part of the above-described processing or specifications may be omitted.

<Computer>

The above-described series of processing can be executed by hardware or software. In a case where a series of processing is executed by software, a program included in the software is installed on a computer. Here, the computer includes a computer incorporated in dedicated hardware, a general-purpose personal computer capable of executing various functions by installing various programs, and the like, for example.

Figure 14:
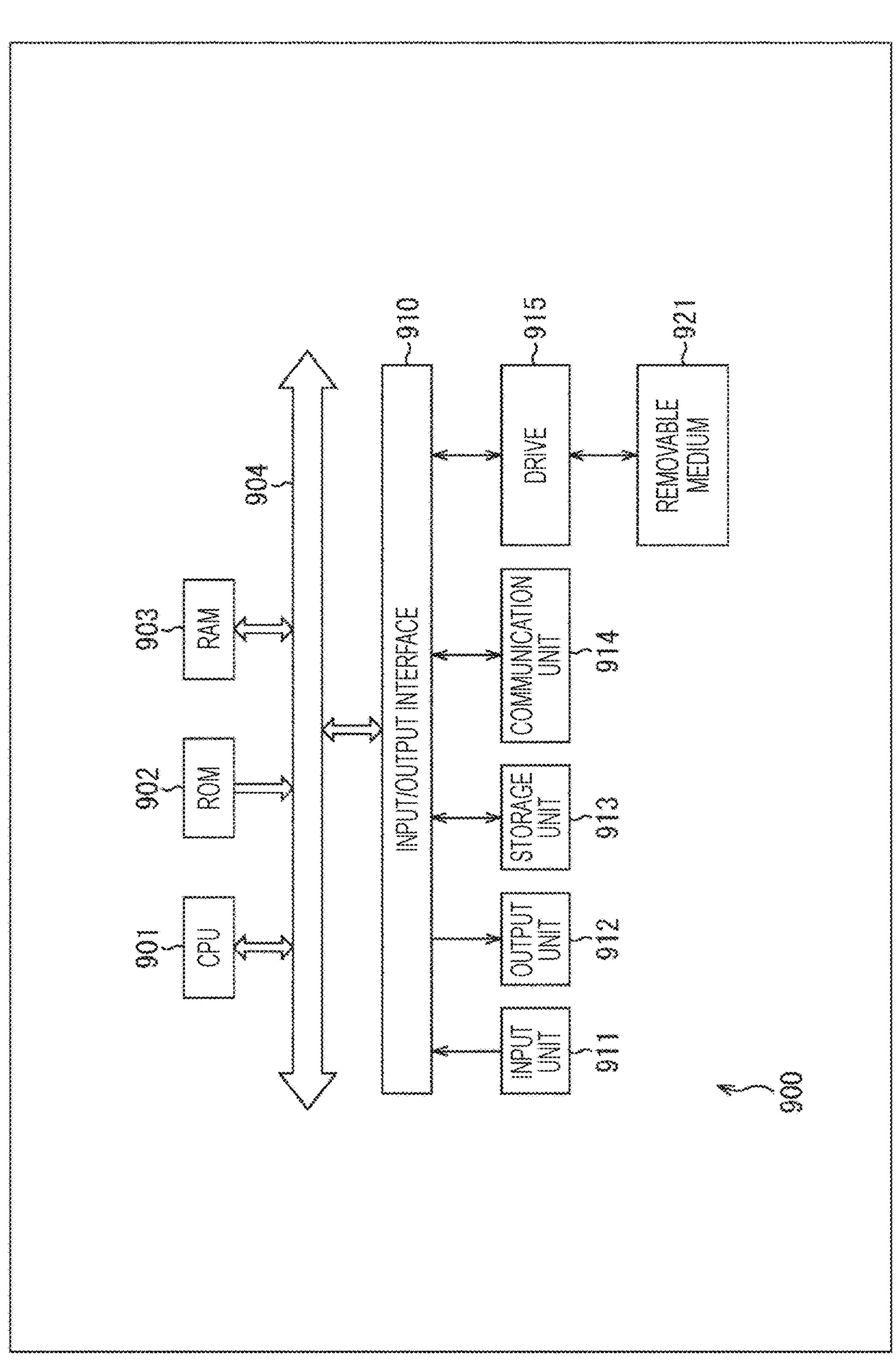
FIG. 14 is a block diagram illustrating a main configuration example of a computer.

FIG. 14 is a block diagram illustrating a configuration example of hardware of a computer that executes the above-described series of processing by a program.

In a computer 900 illustrated in FIG. 14, a central processing unit (CPU) 901, a read only memory (ROM) 902, and a random access memory (RAM) 903 are mutually connected via a bus 904.

Furthermore, an input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a non-volatile memory and the like. The communication unit 914 includes, for example, a network interface. The drive 915 drives a removable medium 921 such as a magnetic disk, an optical disk, a magneto-optical disk, or a semiconductor memory.

In the computer configured as described above, for example, the CPU 901 loads a program stored in the storage unit 913 into the RAM 903 via the input/output interface 910 and the bus 904 and executes the program, whereby the above-described series of processing is performed. Furthermore, the RAM 903 also appropriately stores data and the like necessary for the CPU 901 to execute various types of processing.

A program executed by the computer can be applied by being recorded on the removable medium 921 as a package medium, or the like, for example. In this case, the program can be installed in the storage unit 913 via the input/output interface 910 by attaching the removable medium 921 to the drive 915.

Furthermore, the program can also be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

<Applicable Target of Present Technology>

The present technology may be applied to any configuration. For example, the present technology may be applied to various electronic devices.

Furthermore, for example, the present technology can also be implemented as a partial configuration of a device, such as a processor (for example, a video processor) as a system large scale integration (LSI) or the like, a module (for example, a video module) using a plurality of the processors or the like, a unit (for example, a video unit) using a plurality of the modules or the like, or a set (for example, a video set) obtained by further adding other functions to the unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to any terminal such as a computer, an audio visual (AV) device, a portable information processing terminal, or an Internet of Things (IoT) device.

Note that, in the present specification, a system means a set of a plurality of components (devices, modules (parts) and the like), and it does not matter whether or not all the components are in the same housing. Hence, a plurality of devices stored in different housings and connected via a network and one device in which a plurality of modules is stored in one housing are both systems.

The system, device, processing unit and the like to which the present technology is applied can be used in any field such as traffic, medical care, crime prevention, agriculture, livestock industry, mining, beauty care, factory, household appliance, weather, and natural surveillance, for example. Furthermore, application thereof is also arbitrary.

<Others>

Note that, in the present specification, a “flag” is information for identifying a plurality of states, and includes not only information used for identifying two states of true (1) and false (0) but also information capable of identifying three or more states. Hence, a value that may be taken by the “flag” may be, for example, a binary of 1/0 or a ternary or more. That is, the number of bits forming this “flag” is any number, and may be one bit or a plurality of bits. Furthermore, identification information (including the flag) is assumed to include not only identification information thereof in a bitstream but also difference information of the identification information with respect to certain reference information in the bitstream, and thus, in the present specification, the “flag” and “identification information” include not only the information thereof but also the difference information with respect to the reference information.

Furthermore, various kinds of information (such as metadata) related to encoded data (a bitstream) may be transmitted or recorded in any form as long as it is associated with the encoded data. Here, the term “associating” means, when processing one data, allowing other data to be used (to be linked), for example. That is, the data associated with each other may be collected as one data or may be made individual data. For example, information associated with the encoded data (image) may be transmitted on a transmission path different from that of the encoded data (image). Furthermore, for example, the information associated with the encoded data (image) may be recorded in a recording medium different from that of the encoded data (image) (or another recording area of the same recording medium). Note that, this “association” may be of not entire data but a part of data. For example, an image and information corresponding to the image may be associated with each other in any unit such as a plurality of frames, one frame, or a part within a frame.

Note that, in the present specification, terms such as “combine”, “multiplex”, “add”, “integrate”, “include”, “store”, “put in”, “introduce”, and “insert” mean, for example, to combine a plurality of objects into one, such as to combine encoded data and metadata into one data, and mean one method of “associating” described above.

Furthermore, the embodiment of the present technology is not limited to the above-described embodiment and various modifications may be made without departing from the scope of the present technology.

For example, a configuration described as one device (or processing unit) may be divided and configured as a plurality of devices (or processing units). Conversely, configurations described above as a plurality of devices (or processing units) may be collectively configured as one device (or processing unit). Furthermore, it goes without saying that a configuration other than the above-described configurations may be added to the configuration of each device (or each processing unit). Moreover, when the configuration and operation as the entire system are substantially the same, a part of the configuration of a certain device (or processing unit) may be included in the configuration of another device (or another processing unit).

Furthermore, for example, the above-described programs may be executed in an arbitrary device. In this case, it is sufficient if the device is only required to have a necessary function (functional block and the like) and obtain necessary information.

Furthermore, for example, each step in one flowchart may be executed by one device, or may be executed by being shared by a plurality of devices. Moreover, in a case where a plurality of pieces of processing is included in one step, the plurality of pieces of processing may be executed by one device, or may be shared and executed by a plurality of devices. In other words, a plurality of pieces of processing included in one step can be executed as a plurality of steps. Conversely, the processes described as the plurality of the steps can also be collectively executed as one step.

Furthermore, for example, in a program executed by the computer, processing of steps describing the program may be executed in a time-series order in the order described in the present specification, or may be executed in parallel or individually at a required timing such as when a call is made. That is, as long as there is no contradiction, the processing of each step may be executed in an order different from the above-described order. Moreover, the processes in the steps describing the program may be executed in parallel with processes of another program, or may be executed in combination with processes of the other program.

Furthermore, for example, a plurality of technologies related to the present technology can be implemented independently as a single entity as long as there is no contradiction. It goes without saying that any plurality of present technologies can be implemented in combination. For example, a part or all of the present technologies described in any of the embodiments can be implemented in combination with a part or all of the present technologies described in other embodiments. Furthermore, a part or all of any of the above-described present technologies can be implemented together with another technology that is not described above.

Note that the present technology may also have the following configurations.

(1) An information processing device including:

a meta information encoding unit that encodes meta information including vertex information with a first granularity which indicates coordinates of vertices of a mesh representing an object having a three-dimensional structure, and generates encoded data of the meta information;

a geometry image encoding unit that encodes a geometry image with a second granularity set independently of the first granularity in which a plurality of patches obtained by dividing a geometry of the mesh is arranged, and generates encoded data of the geometry image;

a texture image encoding unit that encodes a texture image with a third granularity set independently of the first granularity in which a plurality of patches obtained by dividing a texture of the mesh is arranged, and generates encoded data of the texture image; and a provision unit that provides the encoded data of the meta information, the encoded data of the geometry image, and the encoded data of the texture image.

(2) The information processing device according to (1), in which the provision unit further provides granularity information regarding the first granularity, the second granularity, and the third granularity.

(3) The information processing device according to (2), further including:

a geometry image generation unit that generates the geometry image with the second granularity; and a texture image generation unit that generates the texture image with the third granularity, in which the geometry image encoding unit encodes the geometry image generated by the geometry image generation unit, and the texture image encoding unit encodes the texture image generated by the texture image generation unit.

(4) The information processing device according to (3), in which the geometry image generation unit arranges the plurality of patches of the geometry within an effective region having a first size in the geometry image, and the texture image generation unit arranges the plurality of patches of the texture in an effective region having a second size in the texture image.

(5) The information processing device according to (4), in which the provision unit further provides information regarding the first size and the second size.

(6) The information processing device according to any one of (3) to (5), in which in a case where a plurality of vertices is arranged at the same position in generation of the geometry image based on the second granularity, the geometry image generation unit applies, as a pixel value of the position, an average value or a mode value of pixel values corresponding to the plurality of respective vertices.

(7) The information processing device according to any one of (3) to (6), in which in a case where a plurality of vertices is arranged at the same position in generation of the geometry image based on the second granularity, the geometry image generation unit arranges the plurality of vertices at different pixels, respectively, with the same position as a reference.

(8) The information processing device according to any one of (3) to (7), in which the geometry image generation unit generates information regarding overlapping points which are a plurality of vertices arranged at the same position in generation of the geometry image based on the second granularity, the geometry image encoding unit generates encoded data of the information regarding the overlapping points, and the provision unit provides the encoded data of the information regarding the overlapping points.

(9) The information processing device according to any one of (3) to (8), in which in a case where a plurality of vertices is arranged at the same position in generation of the geometry image based on the second granularity, the geometry image generation unit corrects surrounding pixel values around the same position during decoding to reduce an error in interpolation processing of the plurality of vertices based on the surrounding pixel values.

(10) An information processing method including:

encoding meta information including vertex information with a first granularity which indicates coordinates of vertices of a mesh representing an object having a three-dimensional structure, and generating encoded data of the meta information;

encoding a geometry image with a second granularity set independently of the first granularity in which a plurality of patches obtained by dividing a geometry of the mesh is arranged, and generating encoded data of the geometry image;

encoding a texture image with a third granularity set independently of the first granularity in which a plurality of patches obtained by dividing a texture of the mesh is arranged, and generating encoded data of the texture image; and providing the encoded data of the meta information, the encoded data of the geometry image, and the encoded data of the texture image.

(11) An information processing device including:

an acquisition unit that acquires, from a bitstream of a mesh representing an object having a three-dimensional structure, encoded data of meta information including vertex information with a first granularity which indicates coordinates of vertices of the mesh, encoded data of a geometry image with a second granularity set independently of the first granularity in which a plurality of patches obtained by dividing a geometry of the mesh is arranged, and a texture image with a third granularity set independently of the first granularity in which a plurality of patches obtained by dividing a texture of the mesh is arranged;

a meta information decoding unit that decodes the encoded data of the meta information and generates the meta information including the vertex information with the first granularity;

a geometry image decoding unit that decodes the encoded data of the geometry image with the second granularity and generates the geometry image with the second granularity; and a texture image decoding unit that decodes the encoded data of the texture image with the third granularity and generates the texture image with the third granularity.

(12) The information processing device according to (11), in which the acquisition unit acquires granularity information regarding the first granularity, the second granularity, and the third granularity from the bitstream.

(13) The information processing device according to (12), further including a UV map generation unit that generates a UV map with the third granularity on the basis of the vertex information with the first granularity and the granularity information.

(14) The information processing device according to (12) or (13), further including:

a patch reconstruction unit that reconstructs the plurality of patches arranged in the geometry image with the second granularity to have the first granularity on the basis of the vertex information with the first granularity and the granularity information; and a vertex information reconstruction unit that reconstructs the vertex information with the first granularity by using the patches with the first granularity.

(15) The information processing device according to (14), in which the acquisition unit further acquires information regarding a first size from the bitstream, and the patch reconstruction unit reconstructs the plurality of patches of the geometry image with the second granularity which are arranged in an effective region having the first size to have the first granularity on the basis of the information regarding the first size.

(16) The information processing device according to (15), in which the acquisition unit further acquires information regarding a second size from the bitstream, and the information processing device further includes a cut-out unit that cuts out an effective region having the second size from the texture image with the third granularity on the basis of the information regarding the second size.

(17) The information processing device according to any one of (14) to (16), in which the patch reconstruction unit returns a vertex moved from a pixel to another pixel when the geometry image with the second granularity is encoded to the original pixel before corresponding movement and reconstructs the plurality of patches of the geometry image to have the first granularity.

(18) The information processing device according to any one of (14) to (17), in which the acquisition unit acquires, from the bitstream, information regarding overlapping points which are a plurality of vertices arranged at the same position in the geometry image with the second granularity, and the patch reconstruction unit reconstructs the plurality of patches of the geometry image with the second granularity to have the first granularity on the basis of the information regarding the overlapping points.

(19) The information processing device according to any one of (14) to (18), in which the patch reconstruction unit reconstructs the plurality of patches of the geometry image with the second granularity to have the first granularity by interpolating a plurality of vertices on the basis of surrounding pixel values around a single position where the plurality of vertices is arranged in the geometry image with the second granularity.

(20) An information processing method including:

acquiring, from a bitstream of a mesh representing an object having a three-dimensional structure, encoded data of meta information including vertex information with a first granularity which indicates coordinates of vertices of the mesh, encoded data of a geometry image with a second granularity set independently of the first granularity in which a plurality of patches obtained by dividing a geometry of the mesh is arranged, and a texture image with a third granularity set independently of the first granularity in which a plurality of patches obtained by dividing a texture of the mesh is arranged;

decoding the encoded data of the meta information and generating the meta information including the vertex information with the first granularity;

decoding the encoded data of the geometry image with the second granularity and generating the geometry image with the second granularity; and decoding the encoded data of the texture image with the third granularity and generating the texture image with the third granularity.

REFERENCE SIGNS LIST

300 Encoding device
311 Mesh voxelization unit
312 Patch generation unit
313 Image generation unit
314 Meta information encoding unit
315 2D encoding unit
316 Image generation unit
317 2D encoding unit
318 Multiplexing unit
400 Decoding device
411 Demultiplexing unit
412 Meta information decoding unit
413 and 414 2D decoding unit
415 Patch reconstruction unit
416 Resolution conversion unit
417 Vertex information reconstruction unit
418 Cutout unit
900 Computer

The invention claimed is:

1. An information processing device comprising:

circuitry configured to encode meta information including vertex information with a first granularity which indicates coordinates of vertices of a mesh representing an object having a three-dimensional structure, generate encoded data of the meta information, encode a geometry image with a second granularity set independently of the first granularity in which a plurality of patches obtained by dividing a geometry of the mesh is arranged, generate encoded data of the geometry image, encode a texture image with a third granularity set independently of the first granularity in which a plurality of patches obtained by dividing a texture of the mesh is arranged, generate encoded data of the texture image, provide the encoded data of the meta information, the encoded data of the geometry image, and the encoded data of the texture image, and provide resolution information including a first resolution parameter regarding the first granularity, a second resolution parameter regarding the second granularity, and a third resolution parameter regarding the third granularity that are controlled independently of respective image sizes of the geometry image and the texture image, wherein the second resolution parameter and the third resolution parameter are defined as logical sampling intervals to be applied during reconstruction of the mesh to identify vertex positions within the respective image sizes.

2. The information processing device according to claim 1, wherein the circuitry is further configured to:

generate the geometry image with the second granularity, and generate the texture image with the third granularity.

3. The information processing device according to claim 2, wherein the circuitry is further configured to arrange the plurality of patches of the geometry within an effective region having a first size in the geometry image, and wherein the circuitry arranges the plurality of patches of the texture in an effective region having a second size in the texture image.

4. The information processing device according to claim 3, wherein the circuitry is further configured to information regarding the first size and the second size.

5. The information processing device according to claim 2, wherein in a case where a plurality of vertices is arranged at a same position in generation of the geometry image based on the second granularity, the circuitry is further configured to apply, as a pixel value of the position, an average value or a mode value of pixel values corresponding to the plurality of respective vertices.

6. The information processing device according to claim 2, wherein in a case where a plurality of vertices is arranged at a same position in generation of the geometry image based on the second granularity, the circuitry is further configured to arrange the plurality of vertices at different pixels, respectively, with the same position as a reference.

7. The information processing device according to claim 2, wherein the circuitry is further configured to generate information regarding overlapping points which are a plurality of vertices arranged at a same position in generation of the geometry image based on the second granularity, generate encoded data of the information regarding the overlapping points, and provide the encoded data of the information regarding the overlapping points.

8. The information processing device according to claim 1, wherein in a case where a plurality of vertices is arranged at a same position in generation of the geometry image based on the second granularity, the circuitry is further configured to correct surrounding pixel values around the same position during decoding to reduce an error in interpolation processing of the plurality of vertices based on the surrounding pixel values.

9. An information processing method comprising:

encoding meta information including vertex information with a first granularity which indicates coordinates of vertices of a mesh representing an object having a three-dimensional structure;

generating encoded data of the meta information;

encoding a geometry image with a second granularity set independently of the first granularity in which a plurality of patches obtained by dividing a geometry of the mesh is arranged;

generating encoded data of the geometry image;

encoding a texture image with a third granularity set independently of the first granularity in which a plurality of patches obtained by dividing a texture of the mesh is arranged;

generating encoded data of the texture image;

providing the encoded data of the meta information, the encoded data of the geometry image, and the encoded data of the texture image; and providing resolution information including a first resolution parameter regarding the first granularity, a second resolution parameter regarding the second granularity, and a third resolution parameter regarding the third granularity that are controlled independently of respective image sizes of the geometry image and the texture image, wherein the second resolution parameter and the third resolution parameter are defined as logical sampling intervals to be applied during reconstruction of the mesh to identify vertex positions within the respective image sizes.

10. An information processing device comprising:

circuitry configured to acquire, from a bitstream of a mesh representing an object having a three-dimensional structure, encoded data of meta information including vertex information with a first granularity which indicates coordinates of vertices of the mesh, encoded data of a geometry image with a second granularity set independently of the first granularity in which a plurality of patches obtained by dividing a geometry of the mesh is arranged, and a texture image with a third granularity set independently of the first granularity in which a plurality of patches obtained by dividing a texture of the mesh is arranged, acquire, from the bitstream, resolution information including a first resolution parameter regarding the first granularity, a second resolution parameter regarding the second granularity, and a third resolution parameter regarding the third granularity that are controlled independently of respective image sizes of the geometry image and the texture image, decode the encoded data of the meta information, generate the meta information including the vertex information with the first granularity, decode the encoded data of the geometry image with the second granularity, generate the geometry image with the second granularity, decode the encoded data of the texture image with the third granularity, and generate the texture image with the third granularity, wherein the second resolution parameter and the third resolution parameter are defined as logical sampling intervals to be applied during reconstruction of the mesh to identify vertex positions within the respective image sizes.

11. The information processing device according to claim 10, wherein the circuitry is further configured to generate a UV map with the third granularity based on the vertex information with the first granularity and the granularity information.

12. The information processing device according to claim 10, wherein the circuitry is further configured to reconstruct the plurality of patches arranged in the geometry image with the second granularity to have the first granularity based on the vertex information with the first granularity and the granularity information, and reconstruct the vertex information to have the first granularity based on the plurality of reconstructed patches.

13. The information processing device according to claim 12, wherein the circuitry is further configured to acquire information regarding a first size from the bitstream, and wherein the circuitry reconstructs the plurality of patches of the geometry image with the second granularity which are arranged in an effective region having the first size to have the first granularity based on the information regarding the first size.

14. The information processing device according to claim 13, wherein the circuitry is further configured to acquire information regarding a second size from the bitstream, and cut out an effective region having the second size from the texture image with the third granularity based on the information regarding the second size.

15. The information processing device according to claim 12, wherein the circuitry is further configured to return a vertex moved from an original pixel to another pixel when the geometry image with the second granularity is encoded to the original pixel before corresponding movement, and wherein the circuitry reconstructs the plurality of patches of the geometry image to have the first granularity.

16. The information processing device according to claim 12, wherein the circuitry is further configured to acquire, from the bitstream, information regarding overlapping points which are a plurality of vertices arranged at the same position in the geometry image with the second granularity, and wherein the circuitry reconstructs the plurality of patches of the geometry image with the second granularity to have the first granularity based on a basis of the information regarding the overlapping points.

17. The information processing device according to claim 12, wherein the circuitry reconstructs the plurality of patches of the geometry image with the second granularity to have the first granularity by interpolating a plurality of vertices based on surrounding pixel values around a single position where the plurality of vertices is arranged in the geometry image with the second granularity.

18. An information processing method comprising:

acquiring, from a bitstream of a mesh representing an object having a three-dimensional structure, encoded data of meta information including vertex information with a first granularity which indicates coordinates of vertices of the mesh, encoded data of a geometry image with a second granularity set independently of the first granularity in which a plurality of patches obtained by dividing a geometry of the mesh is arranged, and a texture image with a third granularity set independently of the first granularity in which a plurality of patches obtained by dividing a texture of the mesh is arranged;

acquiring resolution information including a first resolution parameter regarding the first granularity, a second resolution parameter regarding the second granularity, and a third resolution parameter regarding the third granularity that are controlled independently of respective image sizes of the geometry image and the texture image;

decoding the encoded data of the meta information;

generating the meta information including the vertex information with the first granularity;

decoding the encoded data of the geometry image with the second granularity;

generating the geometry image with the second granularity;

decoding the encoded data of the texture image with the third granularity; and generating the texture image with the third granularity, wherein the second resolution parameter and the third resolution parameter are defined as logical sampling intervals to be applied during reconstruction of the mesh to identify vertex positions within the respective image sizes.

* * * * *